US011926011B2

(12) United States Patent
Nakano et al.

(10) Patent No.: US 11,926,011 B2
(45) Date of Patent: Mar. 12, 2024

(54) POWERED TOOL

(71) Applicant: KOKI HOLDINGS CO., LTD., Tokyo (JP)

(72) Inventors: Ryosuke Nakano, Hitachinaka (JP); Yoshikazu Yokoyama, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 545 days.

(21) Appl. No.: 16/973,371

(22) PCT Filed: Apr. 12, 2019

(86) PCT No.: PCT/JP2019/015939
§ 371 (c)(1),
(2) Date: Dec. 8, 2020

(87) PCT Pub. No.: WO2019/235065
PCT Pub. Date: Dec. 12, 2019

(65) Prior Publication Data
US 2021/0252657 A1 Aug. 19, 2021

(30) Foreign Application Priority Data
Jun. 8, 2018 (JP) .................................. 2018-110245

(51) Int. Cl.
*B23Q 11/12* (2006.01)
*B25F 5/02* (2006.01)
(Continued)

(52) U.S. Cl.
CPC .............. *B23Q 11/121* (2013.01); *B25F 5/02* (2013.01); *B23D 49/165* (2013.01); *B23D 51/16* (2013.01)

(58) Field of Classification Search
CPC ....... B23Q 11/121; B25F 5/02; B23D 49/165; B23D 51/16
See application file for complete search history.

(56) References Cited

U.S. PATENT DOCUMENTS 2,631,619 A * 3/1953 Folli .................... B23Q 11/005
30/500
4,730,397 A 3/1988 Weiford et al.
(Continued)

FOREIGN PATENT DOCUMENTS

EP 0676563 A2 10/1995
GB 9918168 A 2/2000
(Continued)

OTHER PUBLICATIONS

Office Action dated Dec. 27, 2021 in corresponding Japanese patent application No. 2020-523548.
(Continued)

*Primary Examiner* — Anna K Kinsaul
*Assistant Examiner* — Lucas E. A. Palmer
(74) *Attorney, Agent, or Firm* — NovotechIP International PLLC

(57) ABSTRACT

A powered tool includes a housing, a drive source, a drive body, a sealing part, and a holding part. The drive source is rotatable in the housing. The drive body is supported in the housing and reciprocatable by a driving force of the drive source. The sealing part is in contact with an outer peripheral surface of the drive body. The holding part is positioned around the drive body. The holding part surrounds the sealing part and supports the sealing part to be in contact with the outer peripheral surface of the drive body. The holding part includes a lubrication oil accommodating part retaining a lubricant supplied to the outer peripheral surface of the drive body.

20 Claims, 23 Drawing Sheets

(51) Int. Cl.
  *B23D 49/16* (2006.01)
  *B23D 51/16* (2006.01)

(56) References Cited

U.S. PATENT DOCUMENTS

| | | | | |
|---|---|---|---|---|
| 4,962,588 | A * | 10/1990 | Fushiya | B23D 49/002 30/372 |
| 5,212,887 | A * | 5/1993 | Farmerie | F16F 7/10 30/392 |
| 5,450,925 | A * | 9/1995 | Smith | B23D 49/165 184/5 |
| 5,555,626 | A * | 9/1996 | Fuchs | F16H 23/06 30/392 |
| 5,615,746 | A * | 4/1997 | Chu | B23D 51/10 173/171 |
| 6,226,877 | B1 * | 5/2001 | Ono | B23D 49/162 30/392 |
| 6,249,979 | B1 * | 6/2001 | Bednar | B23D 49/165 30/182 |
| 6,688,005 | B1 * | 2/2004 | Tachibana | B23D 49/165 30/392 |
| 6,772,662 | B2 * | 8/2004 | Marinkovich | B23D 51/16 74/57 |
| 6,810,589 | B2 * | 11/2004 | Lagaly | F16F 15/28 30/392 |
| 8,522,890 | B2 * | 9/2013 | Abe | B25D 17/26 173/48 |
| 2004/0181952 | A1 * | 9/2004 | Hartmann | B23D 51/02 30/392 |
| 2005/0246905 | A1 * | 11/2005 | Tozawa | B23D 51/00 30/392 |
| 2008/0188162 | A1 * | 8/2008 | Kobata | H01L 21/7684 451/8 |
| 2011/0107608 | A1 * | 5/2011 | Wattenbach | F16J 15/3232 30/394 |
| 2012/0291294 | A1 * | 11/2012 | Middleton | B62B 7/00 30/277.4 |
| 2013/0227845 | A1 * | 9/2013 | Fujiwara | B23D 49/165 30/394 |
| 2019/0351539 | A1 * | 11/2019 | Onishi | B23D 49/162 |
| 2020/0282482 | A1 * | 9/2020 | Naoi | B23D 59/04 |
| 2020/0306845 | A1 * | 10/2020 | Kimura | F15B 15/18 |

FOREIGN PATENT DOCUMENTS

| | | |
|---|---|---|
| JP | H11320456 A | 11/1999 |
| JP | 2000-084730 A | 3/2000 |
| JP | 2001088050 A | 4/2001 |
| JP | 2005319542 A | 11/2005 |
| JP | 2008-035821 A | 2/2008 |
| JP | 2008114343 A | 5/2008 |
| WO | 2018100941 A1 | 6/2018 |
| WO | 2019/235065 A1 | 12/2019 |

OTHER PUBLICATIONS

International Preliminary Report on Patentability dated Dec. 8, 2020 in corresponding PCT/JP2019/015939 (English Translation).

Supplementary European Search Report dated Jul. 9, 2021 in corresponding PCT/JP2019/015939.

International Search Report and Written Opinion dated Jul. 16, 2019 by the International Searching Authority (Japan Patent Office) in PCT Application PCT/JP2019/015939 (English Translation of the ISR).

Office Action dated Jun. 6, 2023 in corresponding Japanese patent application No. 2022-139542.

Office Action dated Mar. 30, 2023 in corresponding Chinese patent application No. 201980039121.8.

* cited by examiner

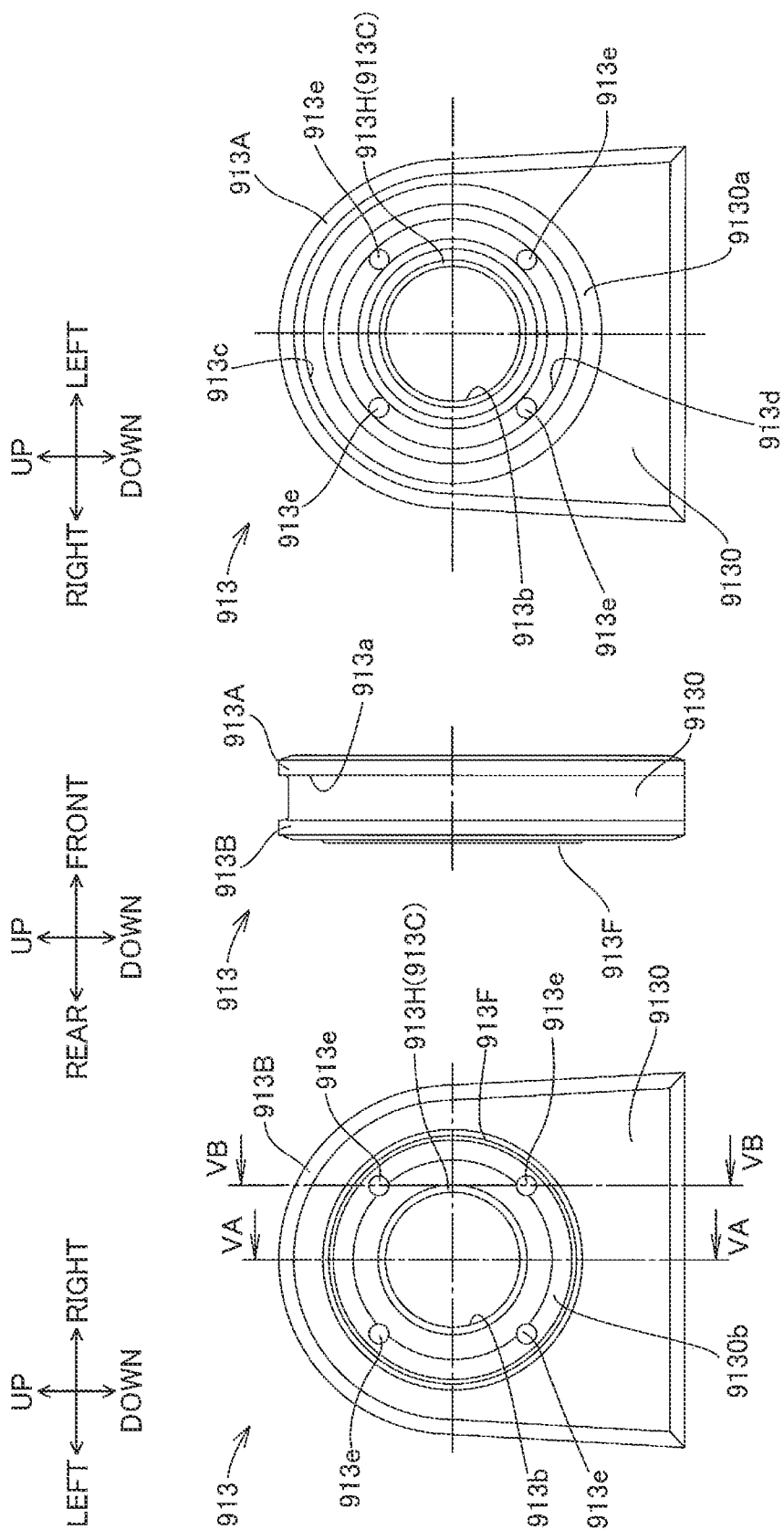

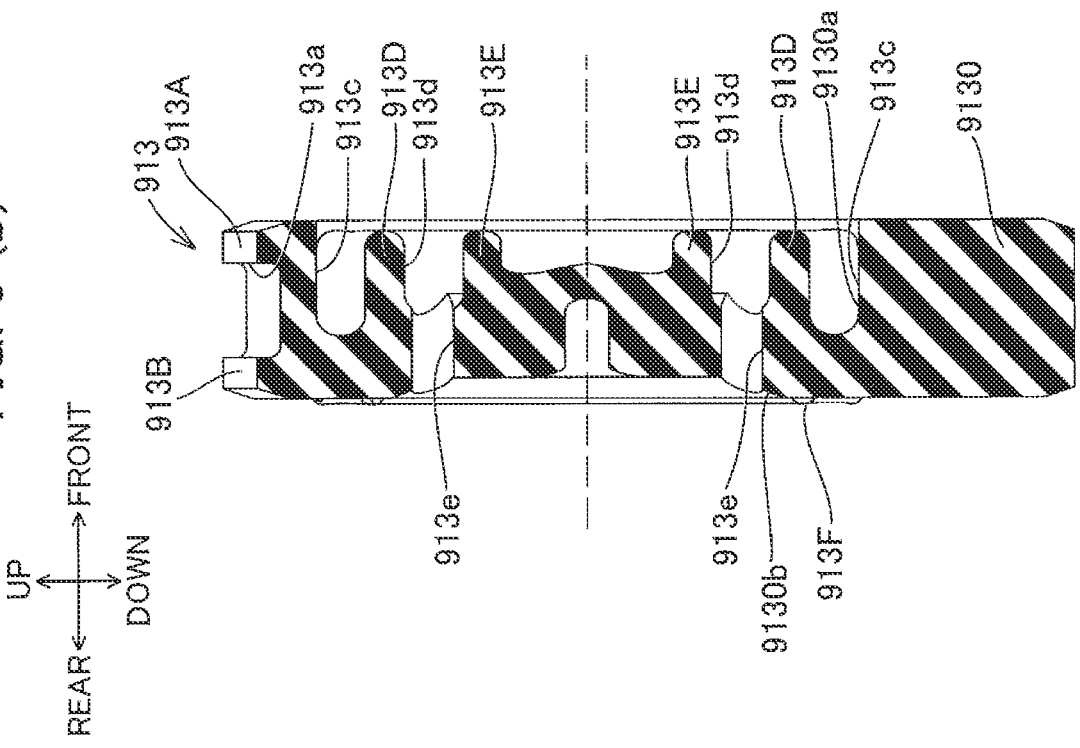
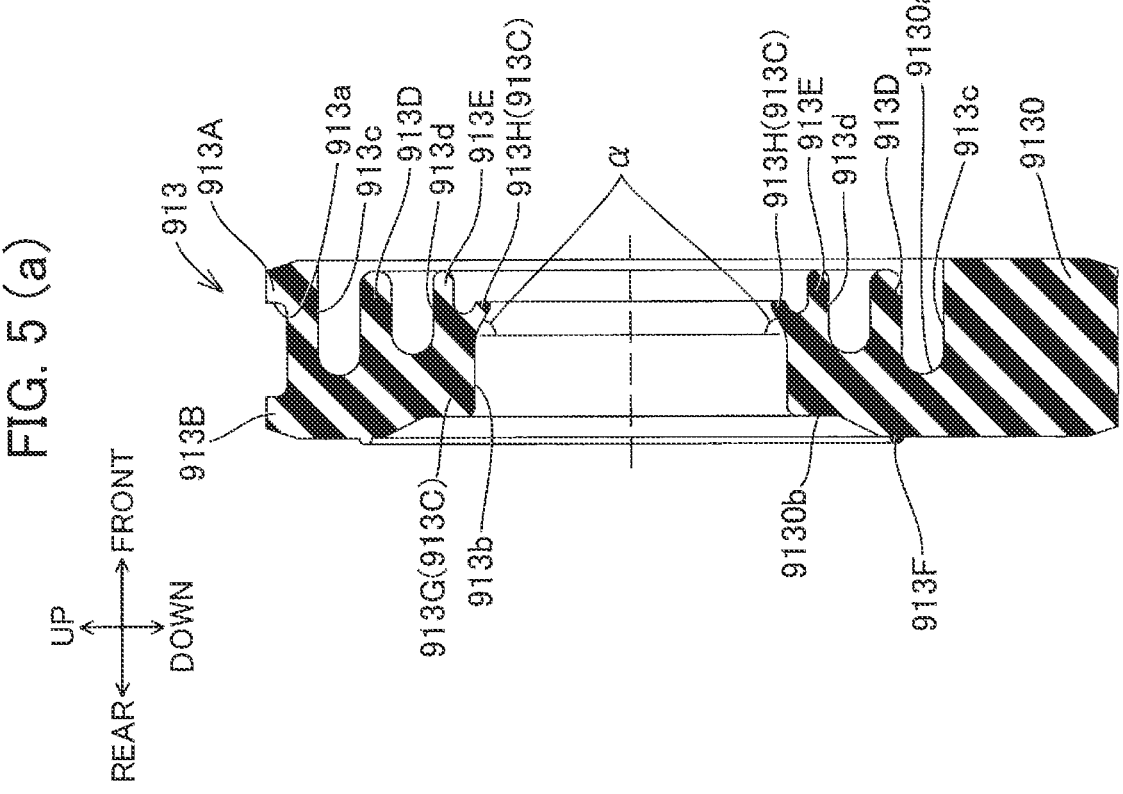

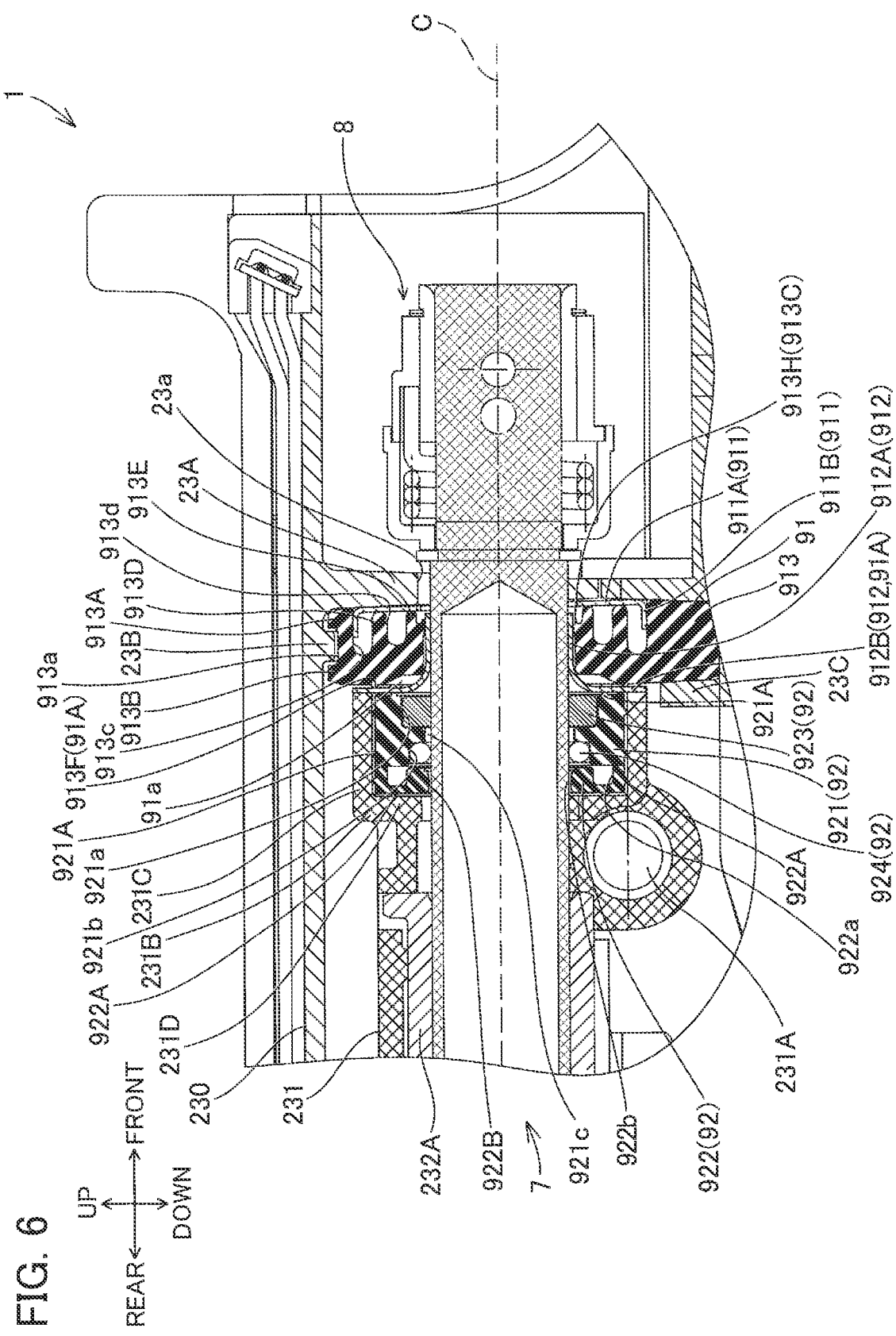

POWERED TOOL

TECHNICAL FIELD

The present invention relates to a powered tool.

BACKGROUND ART

Conventionally, there has been known a reciprocal tool as a powered tool employing a saw blade as an end bit for cutting a wood, a steel, and a metallic pipe, etc. (workpiece). A saber saw is known as the reciprocal tool employing the saw blade as the end bit. The saber saw includes a motor, a motion converting means for converting rotational force of the motor into reciprocal motion, a plunger reciprocally movably supported by a housing and having one end portion extending through an opening part of the housing. The one end portion has a tip end to which the saw blade is attachable (see Patent Literature 1).

According to the conventional saber saw, a seal portion providing a dustproof function is generally provided at a peripheral portion of the opening part in order to prevent dust (cutting chips) generated during cutting operation from entering into the housing.

CITATION LIST

Patent Literature

[PTL 1] Japanese Patent Application Publication No. 2008-114343

SUMMARY OF INVENTION

Technical Problem

However, the seal portion in the conventional saber saw cannot sufficiently prevent the dust generated during the cutting operation from entering into the housing, so that malfunction and reduction in durability may occur due to the dust.

In view of the foregoing, it is an object of the present invention to provide a powered tool providing high dust-proof performance.

Solution to Problem

In order to attain the object, the present invention provides a powered tool including: a housing; a drive source rotatable in the housing; a drive body supported in the housing and operable by a driving force of the drive source; and a holding part positioned around the drive body and retaining therein a fluid of at least one of air and lubricant, the holding part being configured to discharge the fluid outside by an external force generated by driving the drive source.

With this structure, enhanced dustproof performance can be provided by making use of the discharged fluid.

Further, in the above-described structure, it is preferable that: the powered tool further includes a sealing part sealing an outer peripheral surface of the drive body. The holding part supports the sealing part and is configured to supply the lubricant to the sealing part by the external force.

With this structure, since the lubricant is supplied to the sealing part in accordance with driving of the drive part, degradation (frictional wearing) of the sealing part can be restrained. Hence, entry of dust generated during cutting operation into the housing can be suitably restrained.

Further, in the above-described structure, it is preferable that: the external force is transmitted to the holding part through the sealing part.

With this structure, a distance from the holding part to the sealing part can be reduced, so that the supply of the lubricant to the sealing part by the driving operation of the driving part can be suitably performed.

Further, in the above-described structure, it is preferable that: the drive body is movable relative to the housing. A position of the holding part is fixed with respect to at least a part of the housing. the sealing part is configured to urge at least a part of the holding part to transmit the external force to the holding part in response to movement of the sealing part together with the movement of the drive body, so that the lubricant is supplied to the outer peripheral surface of the drive part.

With this structure, since the lubricant can be supplied to the sealing part and its ambient portion in accordance with the driving of the driving part at a timing where the shortage of the lubricant to the sealing part occurs, proper amount of lubricant can be supplied to the sealing part at a proper time, thereby preventing the sealing part from further degradation (frictional wearing). Accordingly, entry of dust generated during cutting operation into the housing can be suitably restrained.

Further, in the above-described structure, it is preferable that: the holding part is an elastic body, and comprises a lubrication oil accommodating part filled with the lubricant, and an accommodating part recessed in a predetermined direction to accommodate therein at least a part of the sealing part. The lubrication oil accommodating part and the accommodating part are communicatable with each other by elastic deformation caused by pressure from the sealing part to the at least the part of the holding part.

With this structure, the simple structure can supply lubricant to the sealing portion.

Further, in the above-described structure, it is preferable that: the holding part has a curved surface facing the outer peripheral surface of the drive part and protruding toward the outer peripheral surface.

With this structure, the holding part can be suitably deformed by the pressure from the sealing part.

Further, in the above-described structure, it is preferable that: the sealing part comprises an O-ring.

With this structure, in a case where the O-ring is displaced integrally with the driving part due to degradation of the O-ring. The O-ring presses against the part of the holding part in accordance with the driving of the driving part so that the lubricant is supplied to the portion between the sealing part and the driving part. Therefore, further degradation (frictional wearing) of the O-ring can be restrained. Accordingly, entry of dust generated during cutting operation into the housing can be suitably restrained.

Further, in the above-described structure, it is preferable that: the housing includes an opening part through which a part of the drive body extends and an interior of the housing is communicated with an outside. The holding part is configured to discharge the fluid toward the opening part by the external force.

With this structure, entry of the dust into the interior through the opening part in communication with the outside can be restrained.

Further, in the above-described structure, it is preferable that: the holding part includes a check valve portion configured to allow the fluid to flow from an interior of the housing to an outside of the housing, but prevent the fluid from flowing from the outside of the housing to the interior of the housing.

With this structure, entry of dust from the outside to the inside of the housing can be suitably restrained.

Further, in the above-described structure, it is preferable that: the drive body is a drive shaft extending in a predetermined direction. The check valve portion includes an extension portion extending toward an axis of the drive shaft and inclined with respect to a direction perpendicular to an axial direction of the drive part.

With this structure, entry of the dust moving along the extending direction of the drive shaft and positioned in the vicinity of the drive shaft can be suitably restrained.

Further, in the above-described structure, it is preferable that: the holding part includes an elastic member defining a space to retain therein the fluid. The elastic member is deformed in response to the external force to reduce a volume of the space so that the holding part discharges the fluid out of the space.

With this structure, the fluid can be suitably discharged.

Further, in the above-described structure, it is preferable that: the elastic member is formed with a through-hole permitting the drive shaft to extend therethrough. The fluid is discharged outside the housing through the through-hole by the reduction in volume of the space. The reduction is caused by the deformation of the elastic member in response to the driving of the drive shaft.

With this structure, dust ambient to the drive shaft can be discharged outside.

Further, in the above-described structure, it is preferable that: the power tool further including a supporting part supporting at least a part of the elastic member. The supporting part and the at least a part of the elastic member define therebetween a suction part configured to permit the fluid to flow into the space.

With this structure, discharge of the fluid can be repeatedly performed.

Further, in the above-described structure, it is preferable that: the drive shaft extends in a predetermined direction. The elastic member is formed with a groove in communication with the through-hole. The lubricant is filled in the groove.

With this structure, since the lubricant is filled in the groove, the discharge of the lubricant can be performed for a prolonged period, thereby suitably restraining the dust from entering into the housing.

Further, in the above-described structure, it is preferable that: the drive body is reciprocally movable relative to the housing. The powered tool includes With this structure, in a case where the sealing portion is reciprocally moved integrally with the driving portion due to degradation of the sealing portion, the sealing portion presses against the part of the holding portion in accordance with the reciprocal movement of the driving portion so that the lubricant is supplied to the portion between the sealing portion and the driving portion. Therefore, further degradation (frictional wearing) of the sealing portion can be restrained. Accordingly, entry of dust generated during cutting operation into the housing can be suitably restrained.

Advantageous Effects of Invention

According to the powered tool of the present invention, entry of dust generated during cutting operation into a main body of the powered tool can be suitably restrained.

BRIEF DESCRIPTION OF DRAWINGS

FIG. 4 is a view illustrating an elastic body of a first dustproof mechanism in the saber saw according to the first embodiment of the present invention, and (a) is a rear view, (b) is a right side view, and (c) is a front view of the elastic body.

FIG. 5 is a cross-sectional side view of the elastic body of first dustproof mechanism in the saber saw according to the first embodiment of the present invention, and (a) is cross-sectional view taken along the line VA-VA in FIGS. 4(a), and (b) is a cross-sectional view taken along the line VB-VB in FIG. 4(a).

FIG. 6 is detailed cross-sectional view illustrating the front portion of the plunger, the blade mounting part, the dustproof mechanism part, and its ambient portion in the saber saw according to the first embodiment of the present invention.

DESCRIPTION OF EMBODIMENTS

Hereinafter, a saber saw which is one example of a powered tool according to a first embodiment of the present invention will be described. In the following description, directions of "upward", "downward", "frontward", and "rearward" will be defined on a basis of FIG. 1. Further, directions of "rightward" and "leftward" will be defined when the saber saw 1 is observed frontward from behind. Further in reference to dimension, and numerical value, etc. not only completely identical dimension and completely identical numerical value but also approximately the same dimension and approximately the same numerical value (for example, due to production error) should be within the meanings of these words. Similarly, the terms "identical", "perpendicular", "parallel", "coincident", "flush with", "constant", and "symmetrical", etc. should be construed to encompass the meanings of "approximately the same", "approximately perpendicular", "approximately parallel", "generally coincident", "approximately flush with", "approximately constant" and "approximately symmetrical", etc.

Figure 1:
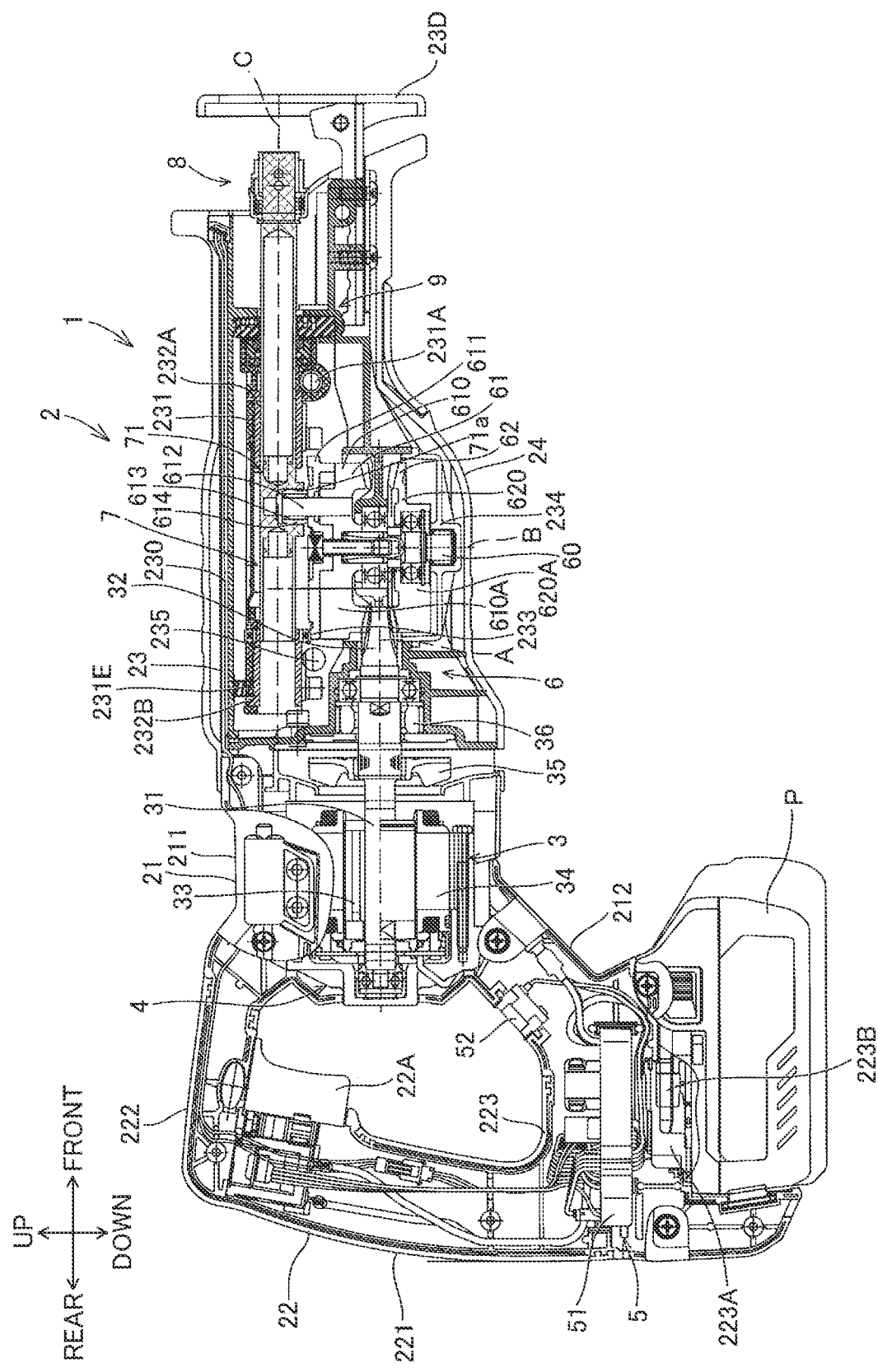
FIG. 1 is a cross-sectional side view illustrating an internal structure of a saber saw according to a first embodiment of the present invention.

The saber saw 1 illustrated in FIG. 1 is an electrically powered reciprocating tool for cutting a workpiece such as a wood, a steel, and a pipe, etc. As illustrated in FIG. 1, the saber saw 1 includes a housing 2 to which a battery pack P is detachably attachable, a motor 3, a control board 4, a control unit 5, a gear unit 6, a plunger 7, a blade mounting part 8 to which a blade Q (FIG. 2) is attachable, and a dustproof mechanism part 9.

The housing 2 forms an outer shell of the saber saw 1, and includes a motor housing 21, a handle housing 22, a gear housing 23, and a front cover 24.

Each of the motor housing 21 and the handle housing 22 is configured as a divided housing that is divided along a dividing plane (virtual plane) orthogonal to the left-right direction and passing through the center portion of the housing 2. The divided right-side portion and left-side portion of each housing are symmetrical about the dividing plane.

As illustrated in FIG. 1, the motor housing 21 includes a hollow cylindrical part 211 and an extension part 212. The hollow cylindrical part 211 is generally hollow cylindrical in shape extending in frontward/rearward direction, and accommodates therein the motor 3 and the control board 4. The extension part 212 extends rearward and diagonally downward from a rear lower end portion of the hollow cylindrical part 211, and has a generally hollow cylindrical shape.

As illustrated in FIG. 1, the handle housing 22 is generally U-shaped in a side view, and is positioned rearward of the motor housing 21. The handle housing 22 has a grip part 221, a first connecting part 222, and a second connecting part 223.

The grip part 221 is the portion that the operator grips when operating the saber saw 1, and extends in the upward/downward direction. A trigger 22A is provided in the upper-front portion of the grip part 221. The trigger 22A can be manually operated in order to control starting and stopping of the motor 3.

The first connecting part 222 extends frontward from an upper end of the grip part 221. A front end portion of the first connecting part 222 is connected with an upper-rear portion of the cylindrical part 211 constituting the motor housing 21.

The second connecting part 223 forms a bottom portion of the handle housing 22 and extends in the frontward/rearward direction. The second connecting part 223 has a front end portion connected to a rear end portion of the extension part 212 of the motor housing 21.

Further, a battery connecting part 223A that can connect to the battery pack P is also provided on the bottom of the second connecting part 223. A battery connecting terminal unit 223B that connects to terminal parts (not shown) on the battery pack P is provided on the battery connecting part 223A.

As illustrated in FIG. 1, the gear housing 23 extends frontward from the hollow cylindrical part 211 of the motor housing 21. The gear housing 23 accommodates therein the gear unit 6 and the plunger 7. The gear housing 23 has a front end portion where a base 23D that contacts the workpiece during a cutting operation is provided. The gear housing 23 includes a main body case 230, a plunger cover 231, a pair of sliding metals 232A, 232B, a bearing 233, a cover 234, and a switch part 235.

Figure 2:
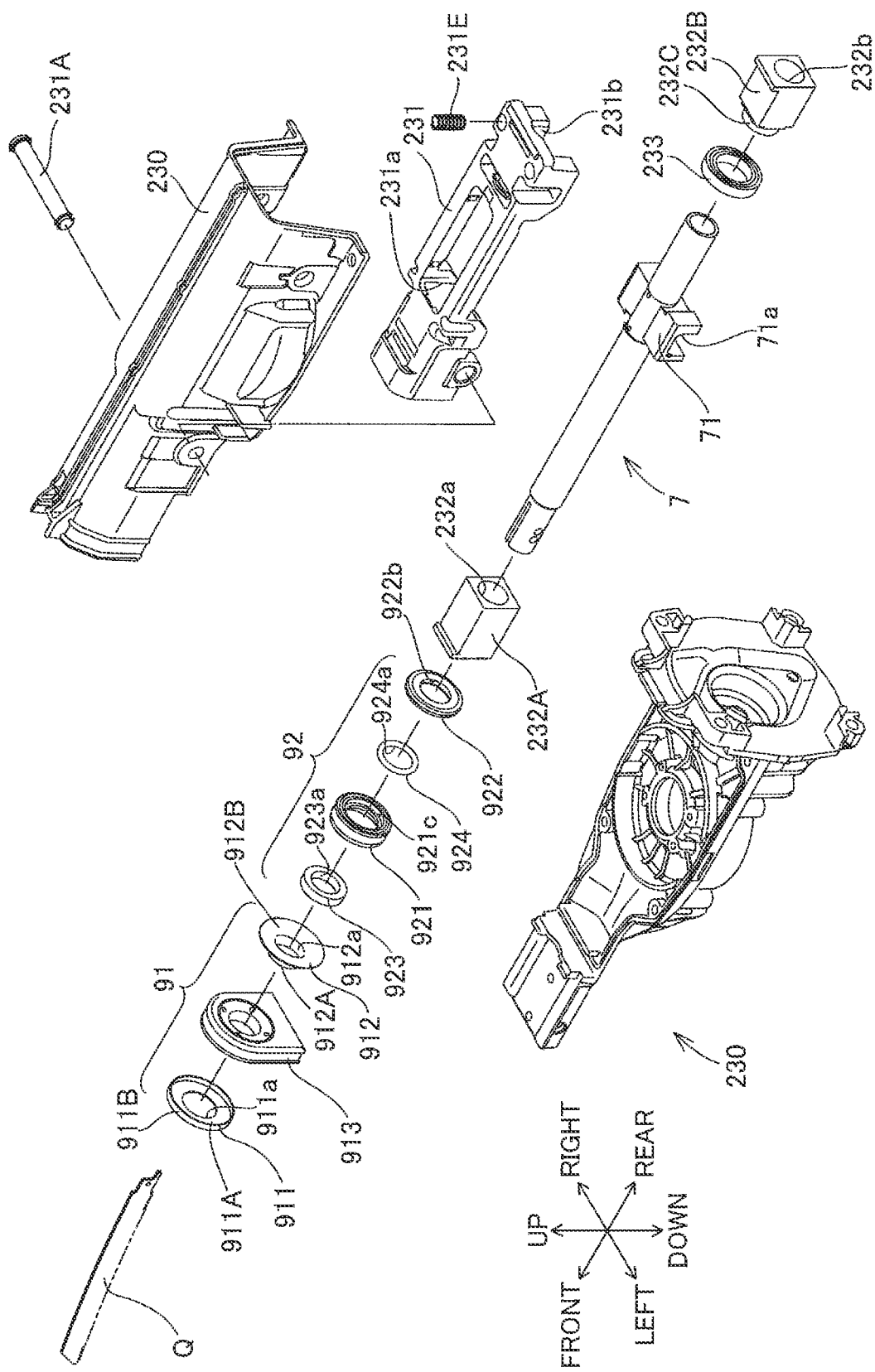
FIG. 2 is an exploded perspective view illustrating a plunger, a dustproof mechanism part, a main body case, and a plunger cover in the saber saw according to the first embodiment of the present invention.
Figure 3:
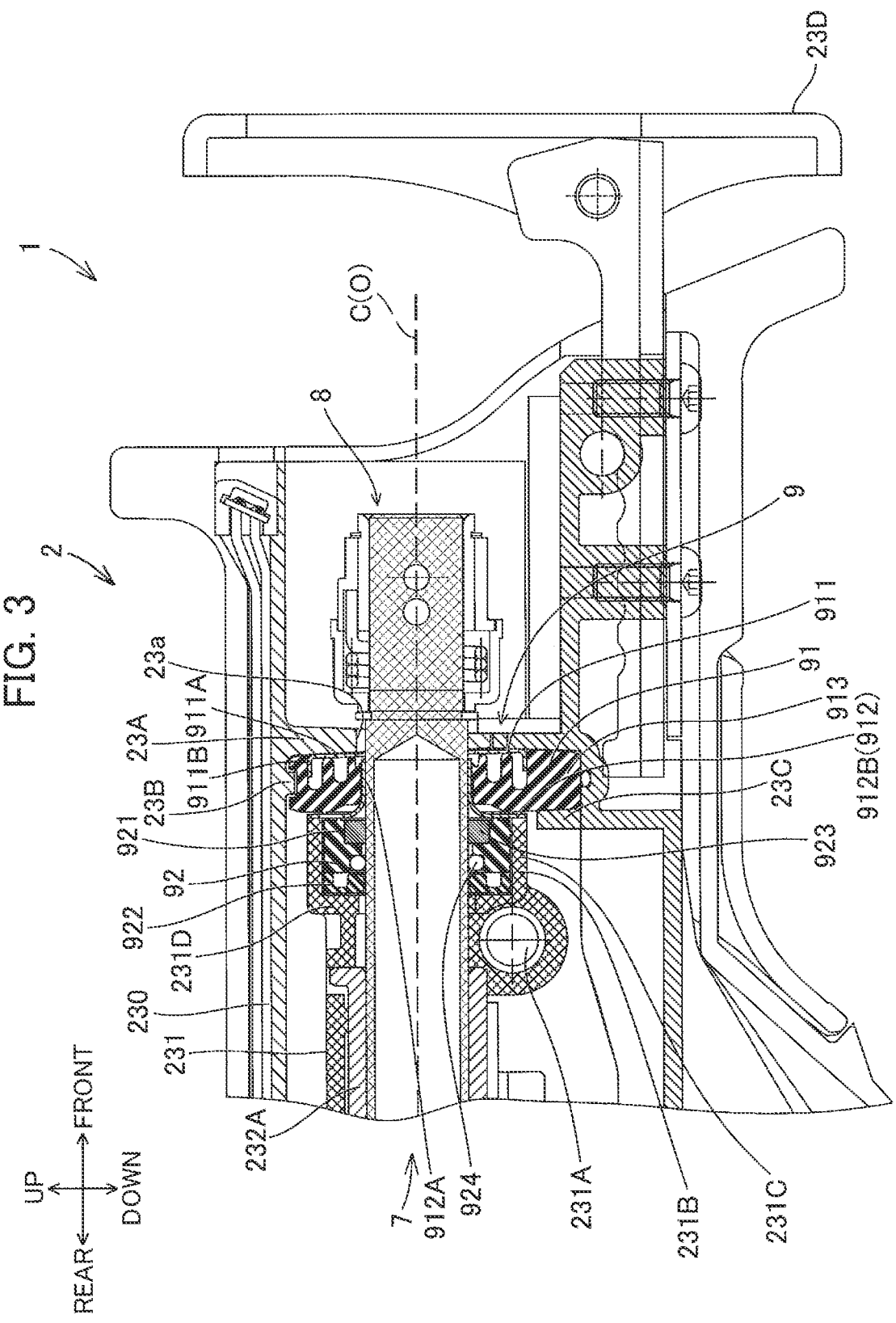
FIG. 3 is detailed cross-sectional view illustrating a front portion of the plunger, a blade mounting part, the dustproof mechanism part, and its ambient portion in the saber saw according to the first embodiment of the present invention.

As illustrated in FIG. 2, the main body case 230 extends in frontward/rearward direction and has a generally hollow cylindrical shape. The main body case 230 supports components within the gear housing 23. The main body case 230 is constituted by divided housings divided at a parting face (imaginary plane) passing through a center in upward/downward direction of the main body case 230 and extending in a direction perpendicular to upward/downward direction. Further, as illustrated in FIG. 3, the main body case 230 includes an opening part 23A, a first extending part 23B, and a second extending part 23C.

The opening part 23A includes a wall protruding inward of the main body case 230 from an inner peripheral surface of the main body case 230. The wall extends over a full periphery of the inner peripheral surface. An opening 23a is defined by a protruding end of the wall. The opening 23a allows an interior of the housing 2 (gear housing 23) to communicate with an outside of the housing. The plunger 7 extends through the opening part 23A (opening 23a). The opening part 23A is an example of an "opening part" in the present invention.

The first extending part 23B is positioned rearward of the opening 23a, and protrudes inward of the main body case 230 from an upper inner peripheral surface of the main body case 230.

The second extending part 23C is positioned rearward of the first extending part 23B, and protrudes inward of the main body case 230 from a lower inner peripheral surface of the main body case 230.

The plunger cover 231 illustrated in FIGS. 1 and 2 is a metallic member extending in frontward/rearward direction. The plunger cover 231 has a front portion formed with a bearing metal positioning portion 231a where the sliding metal 232A is positioned, and has a rear portion formed with a bearing metal positioning portion 231b where the sliding metal 232B is positioned. Each of the bearing metal positioning portion 231a, 231b extends in frontward/rearward direction and is recessed upward in a rectangular shape. Further, the plunger cover 231 includes a pivot shaft 231A and a dustproof mechanism accommodating part 231B.

The pivot shaft 231A is provided at a front lower portion of the plunger cover 231, and extends in leftward/rightward direction. The pivot shaft 231A has a left end portion and a right end portion those supported by the main body case 230. The plunger cover 231 is pivotally movable in upward/downward direction relative to the main body case 230 about an axis of the pivot shaft 231A.

As illustrated in FIG. 3, the dustproof mechanism accommodating part 231B constitutes a front portion of the plunger cover 231, and extends in frontward/rearward direction. The dustproof mechanism accommodating part 231B includes a sleeve part 231C and a bottom part 231D.

The sleeve part 231C has a hollow cylindrical shape extending in frontward/rearward direction. The bottom part 231D is connected to a rear end portion of the sleeve part 231C, and extends inward of the sleeve part 231C. The bottom part 231D has a generally center portion formed with a through-hole into which the plunger 7 is inserted. An inner peripheral surface of the sleeve part 231C and a front surface of the bottom part 231D define a space in which a rear portion of the dustproof mechanism part 9 is accommodated.

Further, as illustrated in FIGS. 1 and 2, a spring 231E is interposed between the main body case 230 and the plunger cover 231. The spring 231E urges the rear portion of the plunger cover 231 downward.

The sliding metal 232A is fixed to the bearing metal positioning portion 231a of the plunger cover 231, and the sliding metal 232B is fixed to the bearing metal positioning portion 231b of the plunger cover 231. The sliding metals 232A and 232B are formed with through-holes 232a, 232b, respectively, through which the plunger 7 is inserted. Hence, the plunger cover 231 supports the plunger 7 through the sliding metals 232A, 232B, so that the plunger 7 is reciprocally movable in frontward/rearward direction. Further, as illustrated in FIG. 2, the sliding metal 232B has a hollow cylindrical portion 232C.

The hollow cylindrical portion 232C constitutes a front end portion of the sliding metal 232B, and extends in frontward/rearward direction. The hollow cylindrical portion 232C has an outer diameter approximately equal to an inner diameter of the bearing 233.

The bearing 233 illustrated in FIGS. 1 and 2 is provided at the hollow cylindrical portion 232C. Specifically, the bearing 233 has an inner race fixed to an outer surface of the hollow cylindrical portion 232C and has an outer race rotatable relative to the hollow cylindrical portion 232C.

The cover 234 illustrated in FIG. 1 constitutes a lower portion of the gear housing 23, and has a generally trapezoidal shape in cross-section. The cover 234 protrudes downward. The cover 234 is disposed to cover a lower portion of the gear unit 6 and supports the lower portion of the gear unit 6.

Figure 7:
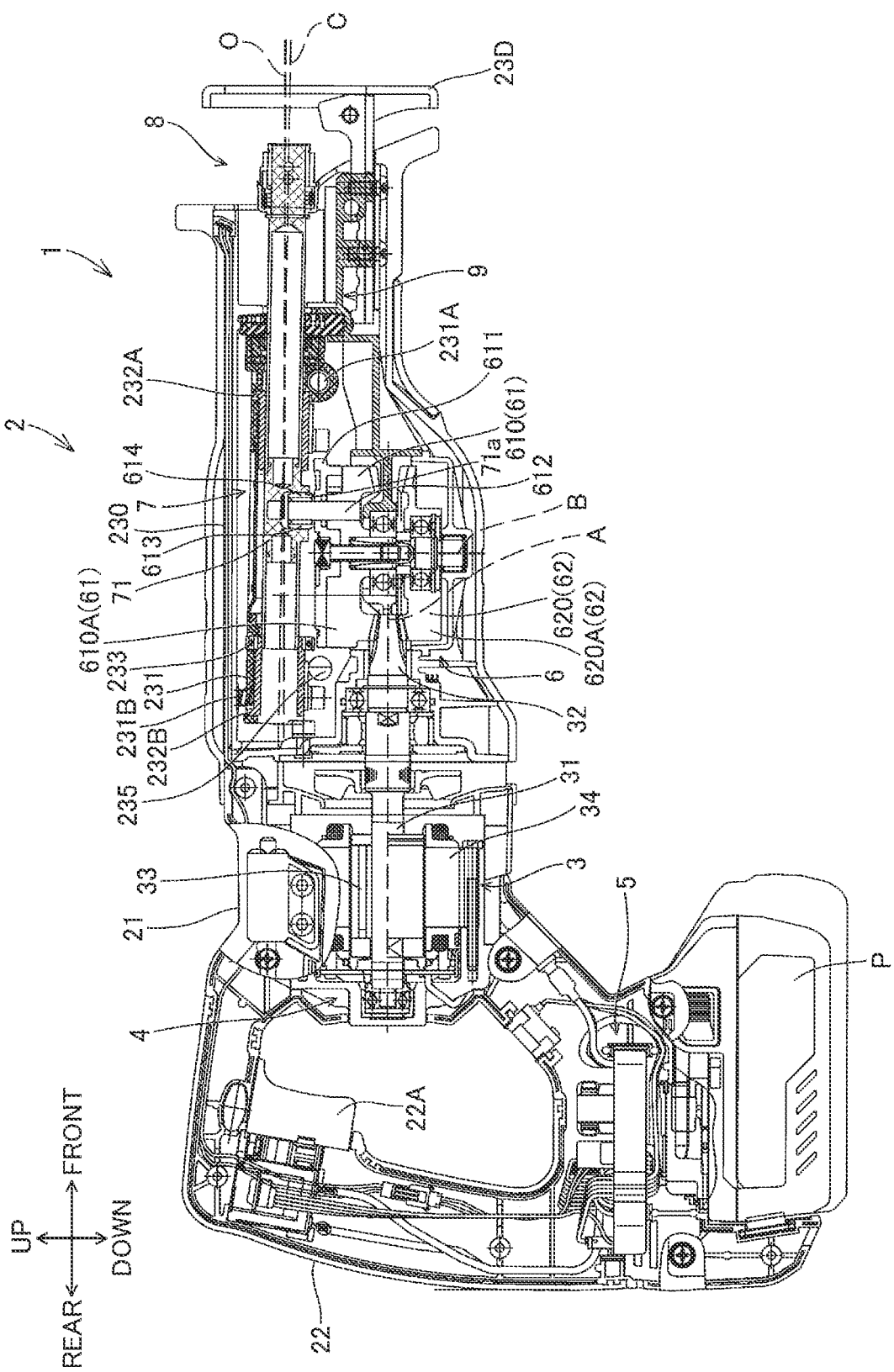
FIG. 7 is a cross-sectional side view illustrating the internal structure of the saber saw during its operational state according to the first embodiment of the present invention, and particularly illustrating a state where a switch part has a depressed posture and the blade mounting part is positioned at a frontward position.
Figure 8:
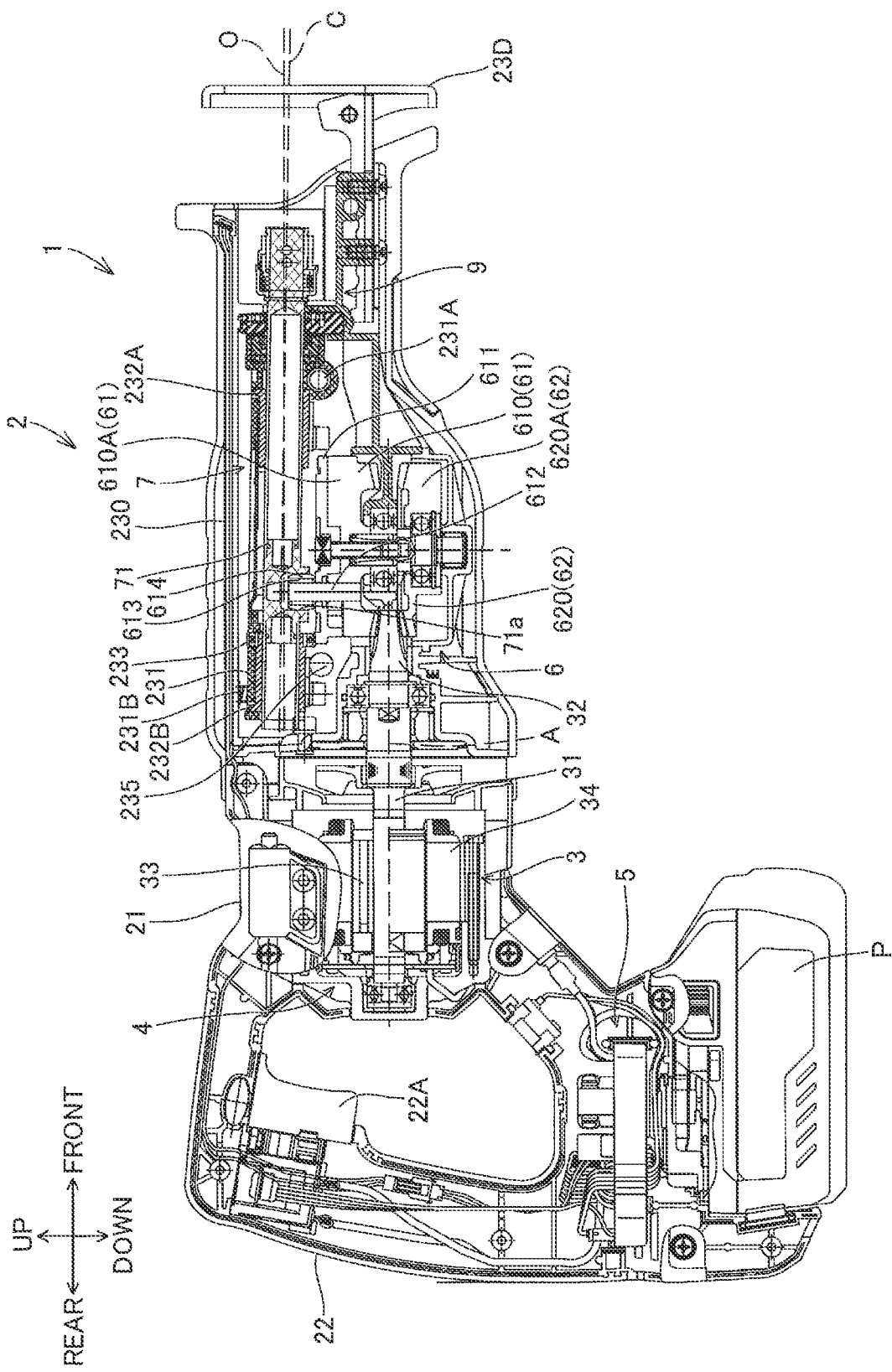
FIG. 8 is a cross-sectional side view illustrating the internal structure of the saber saw during its operational state according to the first embodiment of the present invention, and particularly illustrating a state where the switch part has the depressed posture and the blade mounting part is positioned at a rearward position.
Figure 9:
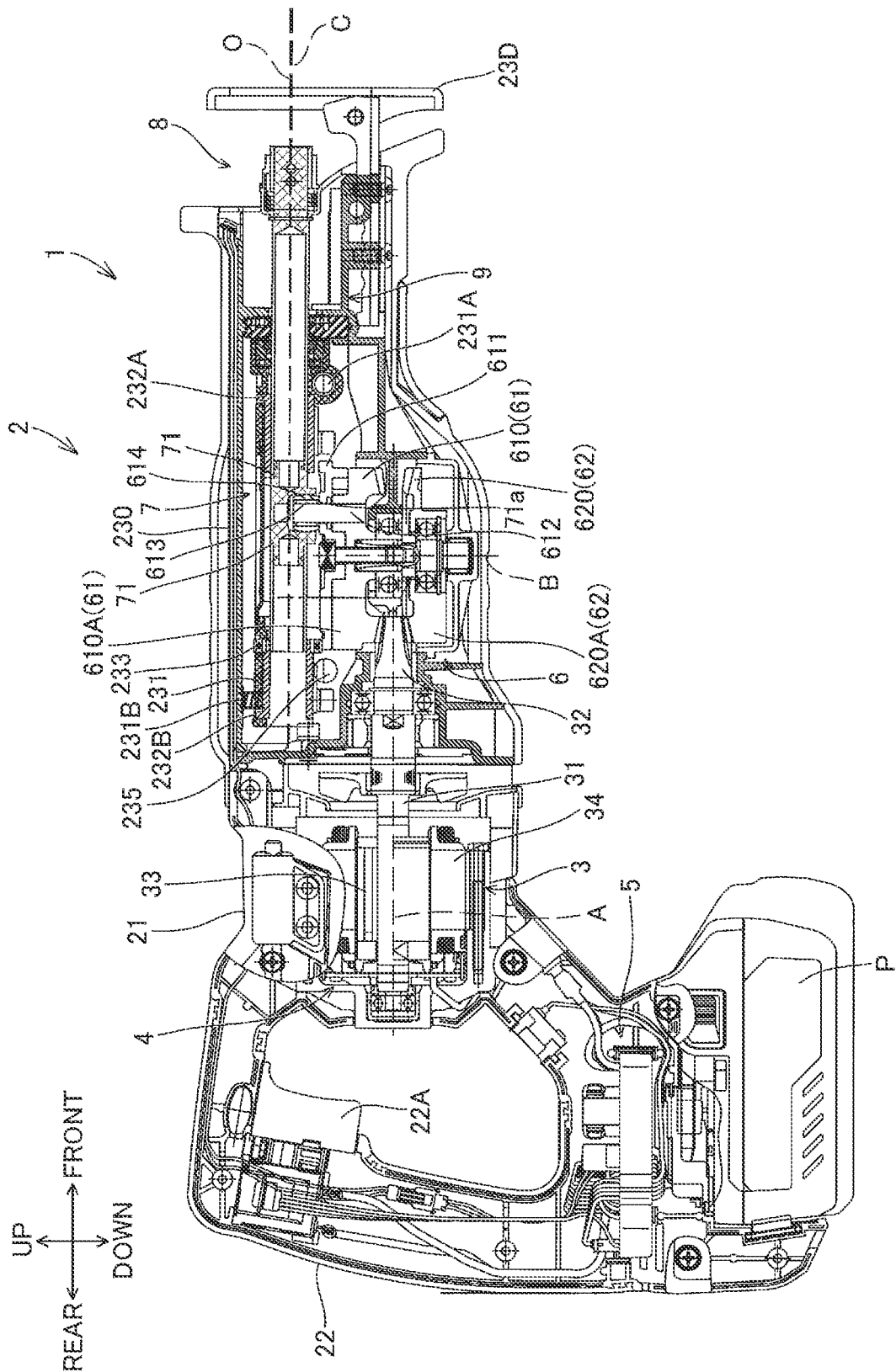
FIG. 9 is a cross-sectional side view illustrating the internal structure of the saber saw during its operational state according to the first embodiment of the present invention, and particularly illustrating a state where the switch part has a released posture and the blade mounting part is positioned at the frontward position.
Figure 10:
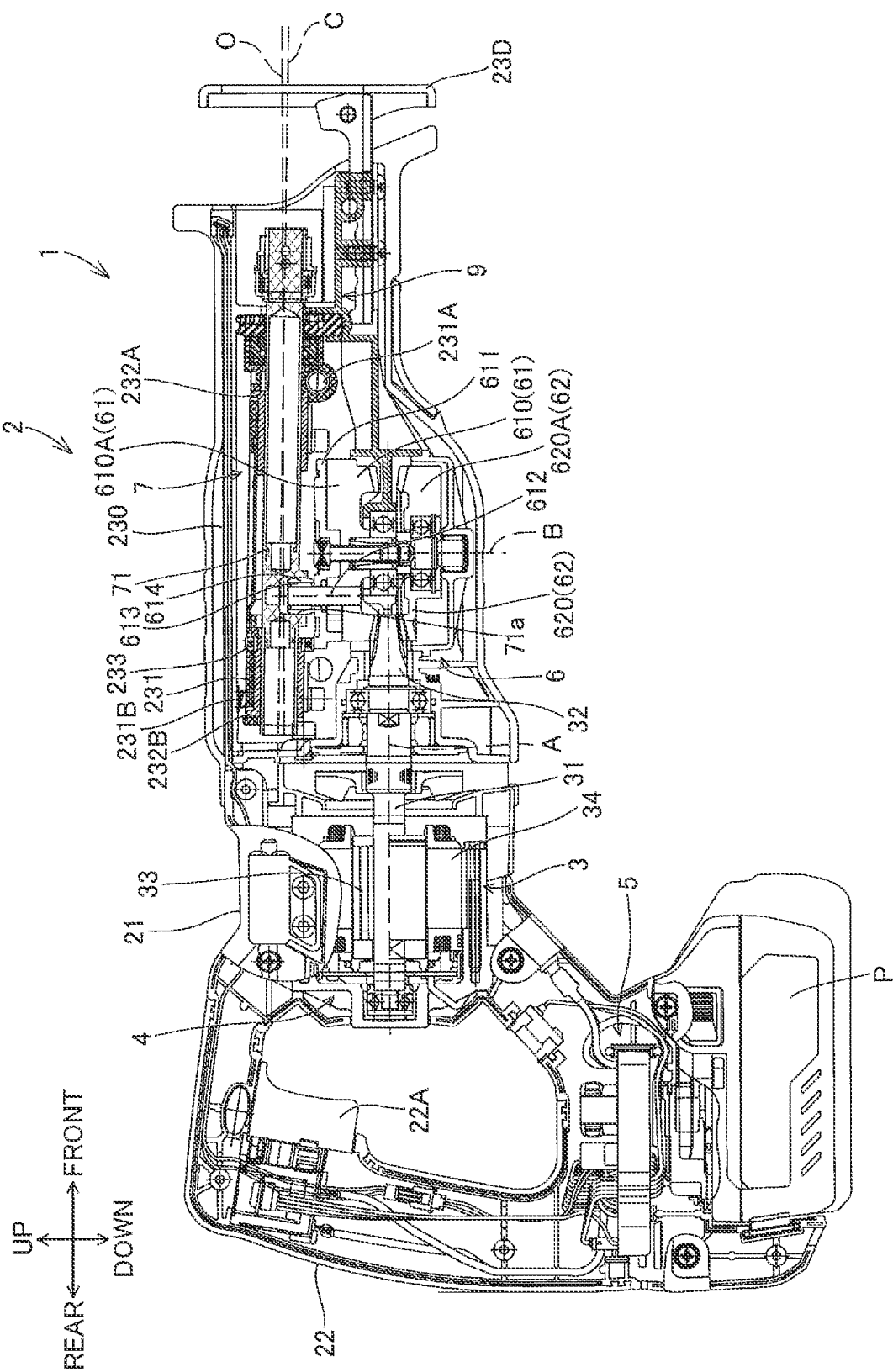
FIG. 10 is a cross-sectional side view illustrating the internal structure of the saber saw during its operational state according to the first embodiment of the present invention, and particularly illustrating a state where the switch part has a released posture and the blade mounting part is positioned at the rearward position.

The switch part 235 is provided at the main body case 230, and is rotatable about an axis extending in leftward/rightward direction. The switch part 235 has a generally semi-circular shape in cross-section taken along a plane perpendicular to leftward/rightward direction. A posture of the switch part 235 is switchable between a depressing posture where the switch part 235 presses the plunger cover 231 and the sliding metal 232B upward and a releasing posture where the upward pressure is released. In the depicted embodiment, the posture of the switch part 235 where the cross-sectional semicircular shape faces frontward is referred to as depressing posture (see FIGS. 7 and 8), and the posture of the switch part 235 where the cross-sectional semicircular shape faces upward is referred to as releasing posture (see FIGS. 9 and 10). In other words, in side view, the depressing posture is such a posture that a string portion of the semicircular shape extends in upward/downward direction, and the releasing posture is such that the string portion extends in frontward/rearward direction.

The front cover 24 illustrated in FIG. 1 has a generally hollow cylindrical shape that extends forward from a front end of the motor housing 21 and that narrows in diameter toward the front. The front cover 24 covers approximately entire outer peripheral surface of the gear housing 23. The front cover 24 is constituted by an elastic member having high insulation and adiabaticity such as for example a resin having high friction coefficient.

The motor 3 illustrated in FIG. 1 is a DC brushless motor including a rotation shaft 31, a pinion 32, a rotor 33, a stator 34, a fan 35, and an elastic body 36. The motor 3 is an example of a "drive source" in the present invention.

The rotation shaft 31 extends in frontward/rearward direction, and is supported by the housing 2 such that the rotation shaft 31 is rotatable about an axis A extending in frontward/rearward direction and is movable in frontward/rearward direction relative to the housing 2. The axis A extends in frontward/rearward direction and is a rotation axis of the rotation shaft 31.

The pinion 32 is provided integrally with a front end portion of the rotation shaft 31, and is rotatable integrally and coaxially with the rotation shaft 31.

The rotor 33 includes a permanent magnet, and is fixed to the rotation shaft 31 to be rotated integrally and coaxially with the rotation shaft 31.

The stator 34 has generally hollow cylindrical shape extending in frontward/rearward direction, and includes three stator coils star-connected. The stator 34 is accommodated in the hollow cylindrical part 211 of the motor housing 21 and is fixed to the housing 2.

The fan 35 is positioned rearward of the pinion 32 and is fixed to the rotation shaft 31 so as to be integrally rotated with the rotation shaft 31.

The elastic body 36 is an elastically deformable rubber member. The elastic body 36 has a generally hollow cylindrical shape extending in frontward/rearward direction. In the depicted embodiment, the elastic body 36 is compressed rearward in accordance with rearward displacement of the rotation shaft 31 and the component integral with the rotation shaft 31 in a case where thrust force acting on the rotation shaft 31 is excessively increased. Hence, impact imparted on the rotation shaft 31 and the gear unit 6 can be mitigated. That is, the rotation shaft 31 and the gear unit 6 can have improved durability against impact imparted thereon, thereby restraining the rotation shaft 31 and the gear unit 6 from breakage and deformation.

The control board 4 has a generally annular shape in front view, and is positioned rearward of the motor 3. A Hall element for detecting an angular position of the rotation shaft 31 of the motor 3, six FETs for controlling the motor 3, and etc. are provided on the control board 4.

The control unit 5 includes a control box 51 and a panel 52.

The control box 51 is formed in a generally rectangular parallelepiped shape. The control box 51 is positioned in the second connecting portion 223 of the handle housing 22. The control box 51 accommodates therein a control board unit (control unit) that selectively output drive signals to the six FETs based on user operations on the trigger 22A and signals outputted from the Hall element 41 to control rotational direction and the rotational speed, etc. of the motor 3. The control board unit is configured of a microcomputer, a drive signal output circuit, and the like, for example.

The panel 52 is fitted with a peripheral wall of the extension part 212 of the motor housing 21, and is electrically connected to the control box 51. The panel 52 has an end face in its extending direction provided with a display unit that is visible to the user. The user can perform cutting operation while monitoring a residual battery level indicator, cutting speed indicator, and the like displayed on this display unit.

As illustrated in FIG. 1, the gear unit 6 includes an intermediate shaft 60, a transmission gear part 61, and a counterweight part 62.

The intermediate shaft 60 has a generally solid cylindrical shape extending in upward/downward direction. The intermediate shaft 60 is supported by the gear housing 23 through a ball bearing having a large diameter and a needle bearing having a small diameter, and is rotatable about an axis B extending in upward/downward direction. The axis B is perpendicular to the rotation shaft 31 of the motor 3, and extends in upward/downward direction passing through an axis of the intermediate shaft 60.

The transmission gear part 61 includes a bevel gear 610, an orbital guide 611, a pin 612, a needle bearing 613, and a connecting piece 614. The bevel gear 610 includes a weight 610A.

The bevel gear 610 has a generally circular shape in a plan view, and is in meshing engagement with the pinion 32 of the motor 3. The bevel gear 610 is configured to be rotated upon receiving driving force from the motor 3. The bevel gear 610 is fixed to the intermediate shaft 60 by a male thread, and is rotatable about the axis B together with the intermediate shaft 60. The bevel gear 610 is rotated in a counterclockwise direction in the plan view. Incidentally, the bevel gear 610 is a gear with teeth cut therein, formed by milling steel. The bevel gear 610 includes the weight 610A. The bevel gear 610 is an example of a "gear unit" in the present invention.

In the bevel gear 610, the weight 610A is positioned opposite to the pin 612 with respect to the axis B. The weight 610A constitutes a part of the bevel gear 610, and is integral with a remaining portion of the bevel gear 610. In other words, the weight 610A is provided in the bevel gear 610, and is rotatable integrally with the bevel gear 610. The weight 610A has a larger mass than the combined mass of all portions of the bevel gear 610 excluding the weight 610A.

The orbital guide 611 is integrally rotatable with the bevel gear 610 about the axis B. The orbital guide 611 has a generally circular shape in plan view whose center is coincident with the axis B, and has a diameter equal to that of the bevel gear 610. Further, the orbital guide 611 has an upper end that is linearly inclined relative to the intermediate shaft 60. In other words, the upper end of the orbital guide 611 is inclined with respect to an imaginary plane extending in a direction parallel to leftward/rightward direction and frontward/rearward direction.

Further, the upper end of the orbital guide 611 is configured to be abuttable on the bearing 233 of the gear housing 23. Specifically, the upper end of the orbital guide 611 is brought into abutment with the bearing 233 to support a rear end portion of the plunger cover 231 through the bearing 233 when the switch part 235 is at the releasing posture. By the rotation of the bevel gear 610, the bearing 233 reciprocally moves in upward/downward direction in response to height of the orbital guide 611 in accordance with a shape of the upper end of the orbital guide 611 while the bearing 233 is rotated. The plunger cover 231 of the gear housing 23 is pivotally moved about the axis of the pivot shaft 231A in upward/downward direction by the reciprocating movement of the bearing 233 in upward/downward direction. Further, since the spring 231E interposed between the main body case 230 and the plunger cover 231 urges the rear portion of the plunger cover 231 downward, the upper end surface of the orbital guide 611 and the bearing 233 are suitably abutted with each other when the switch part 235 is at the releasing posture. Hence, the blade Q attached to the blade mounting part 8 can suitably perform orbital movement. Further, the upper end of the orbital guide 611 is separated from the bearing 233 when the switch part 235 is at the depressing posture. Hence, a constant position of the bearing 233 in upward/downward direction can be maintained irrespective of the rotation of the bevel gear 610. Further, the orbital guide 611 is formed with a through-hole extending throughout a thickness thereof in upward/downward direction at a position eccentric from the axis B.

The pin 612 has a generally solid cylindrical shape extending in upward/downward direction. The pin 612 has a lower portion force-fitted with the bevel gear 610 at a position eccentric from the axis B. The pin 612 has an upper portion extending through the through-hole of the orbital guide 611, and protrudes upward from the 611 in the extending direction of the axis B.

The needle bearing 613 is positioned at the upper portion of the pin 612. In other words, the needle bearing 613 is positioned at the protruding end portion of the pin 612. The needle bearing 613 is rotatable relative to the pin 612.

The connecting piece 614 has a generally hollow cylindrical shape extending in upward/downward direction. The connecting piece 614 has an inner peripheral surface at which the needle bearing 613 is rotatably provided. Hence, the connecting piece 614 is rotatable relative to the pin 612.

The counterweight part 62 is positioned below the bevel gear 610, and is positioned opposite to the bevel gear 610 in upward/downward direction with respect to the axis A of the rotation shaft 31. The counterweight part 62 includes a bevel gear 620 and a weight 620A.

The bevel gear 620 has a rear portion in meshing engagement with the pinion 32, and is rotatable about the axis B relative to the intermediate shaft 60 through a bearing. The bevel gear 620 is rotatable in a clockwise direction in plan view. That is, the bevel gear 620 is rotated in a direction opposite to the rotational direction of the bevel gear 610. The bevel gear 620 has gear teeth whose number is equal to that of the gear teeth of the bevel gear 610.

The weight 620A is formed integral with a remaining portion of counterweight part 62, and constitutes a part of the counterweight part 62. The weight 620A has a larger mass than the combined mass of all portions of the counter weight part 62 excluding the weight 620A.

Here, in the depicted embodiment, a product obtained by multiplying a center of gravity of the transmission gear part 61, that is, a center of gravity of an assembled body of the bevel gear 610, the orbital guide 611, the pin 612, the needle bearing 613, and the connecting piece 614 those being rotatable integrally in counterclockwise direction in plan view (hereinafter simply referred to as center of gravity of the transmission gear part 61) by a distance between the center of gravity (center of gravity of the transmission gear part 61) and the axis B is configured to be approximately equal to a product obtained by multiplying a center of gravity of the counterweight part 62, that is, an assembled body of the counterweight part 62 rotatable in clockwise direction in plan view (hereinafter simply referred to as "center of gravity of the counterweight part 62) by a distance between the center of gravity (center of gravity of the counterweight part 62) and the axis B. With this structure, a centrifugal force generated in the transmission gear part 61 can be approximately equal to a centrifugal force generated in the counterweight part 62 when the transmission gear part 61 and the counterweight part 62 are rotated at an equal angular velocity in opposite directions. Accordingly, generation of vibration in a direction perpendicular to the reciprocating direction of the plunger 7 can be properly restrained in the reciprocating tool.

The plunger 7 is positioned between the bevel gear 610 and the blade mounting part 8 in the path of power transmission from the motor 3. The plunger 7 extends in frontward/rearward direction, and is reciprocally movable in frontward/rearward direction with respect to the plunger cover 231 through the pair of sliding metals 232A, 232B those positioned at the front portion and rear portion of the plunger cover 231, respectively. Specifically, the plunger 7 is reciprocally movable along an axis C. The axis C is an axis of the plunger 7. The plunger 7 has a front portion protruding outside of the gear housing 23 through the opening 23a. Further, the plunger 7 is pivotally movable in upward/downward direction in response to pivotal movement of the plunger cover 231 about the axis of the pivot shaft 231A. Further a pin guide 71 is provided at the plunger 7. The plunger 7 is an example of a "drive part", or "drive body", or "drive shaft" in the present invention.

The pin guide 71 is positioned between the bevel gear 610 and the plunger 7 in the path of power transmission from the motor 3, and is configured to convert the rotational movement of the bevel gear 610 into reciprocal movement of the plunger 7. The pin guide 71 is provided integrally with the plunger 7 at a portion rearward of an intermediate portion in frontward/rearward direction of the plunger 7 and frontward of the rear end portion thereof. The pin guide 71 has a lower portion formed with a guide groove 71a extending in leftward/rightward direction and recessed upward. The guide groove 71a has a width in frontward/rearward direction slightly greater than a diameter of the pin 612. The connecting piece 614 is connected to the guide groove 71a, and an upper portion of the pin 612 is accommodated in the guide groove 71a and movable in leftward/rightward direction together with the needle bearing 613 and the connecting piece 614. That is, displacement of the pin 612 in frontward/rearward direction relative to the pin guide 71 is restricted, whereas movement of the pin 612 in leftward/rightward direction relative to the pin guide 71 is permitted. More specifically, the pin 612, the needle bearing 613, and the connecting piece 614 are moved in leftward/rightward direction relative to the guide groove 71a by rotating the connecting piece 614 relative to the upper portion of the pin 612. Further, the pin guide 71 is movable in upward/downward direction relative to the pin 612. The pin guide 71 is an example of a "motion converting mechanism part".

The blade mounting part 8 is positioned at a front end portion of the plunger 7, and is configured to permit the blade Q for cutting a workpiece to be attached to the blade mounting part 8. The blade mounting part 8 is reciprocally movable along the axis C.

The dustproof mechanism part 9 will next be described with reference to FIGS. 2 through 6. As illustrated in FIG. 2, the dustproof mechanism part 9 includes a first dustproof mechanism 91 and a second dustproof mechanism 92.

As illustrated in FIG. 3, the first dustproof mechanism 91 is positioned at the opening part 23A of the gear housing 23 so as to surround an outer peripheral surface of the plunger 7. Specifically, the first dustproof mechanism 91 is positioned adjacent to the opening 23a. As illustrated in FIGS. 2 and 3, the first dustproof mechanism 91 includes a first nipping member 911, a second nipping member 912, and an elastic body 913. The first dustproof mechanism 91 is an example of a "discharge mechanism part" and "retaining part" in the present invention. The first nipping member 911 and the second nipping member 912 are examples of a "supporting part" in the present invention.

The first nipping member 911 illustrated in FIGS. 2 and 3 is made from metal, and is positioned in the gear housing 23 such that a front surface of the first nipping member 911 is in abutment with a rear surface of a wall forming the opening 23a of the gear housing 23. The first nipping member 911 includes a disc portion 911A and an end portion 911B.

The disc portion 911A is generally circular in a rear view. The disc portion 911A has an inner peripheral surface 911a whose diameter is greater than a diameter of the plunger 7. The plunger 7 is inserted in the inner peripheral surface 911a.

The end portion 911B constitutes an outer peripheral edge portion of the first nipping member 911, and protrudes rearward from a radially outer end portion of the disc portion 911A.

The second nipping member 912 is made from metal, and includes a hollow cylindrical portion 912A and an abutment portion 912B.

The hollow cylindrical portion 912A is generally hollow cylindrical and extends in frontward/rearward direction. A through-hole 912a is formed in a generally diametrically center portion of the hollow cylindrical portion 912A. The through-hole 912a has a diameter equal to the outer diameter of the plunger 7. The plunger 7 is inserted in the through-hole 912a. The plunger 7 is slidably reciprocally movable relative to the hollow cylindrical portion 912A (relative to the second nipping member 912).

The abutment portion 912B constitutes a rear portion of the second nipping member 912, and is generally annular shaped in rear view. As illustrated in FIG. 3, the abutment portion 912B initially extends rearward from a rear end of the hollow cylindrical portion 912A with a predetermined curvature to be directed radially outward in the radial direction of the hollow cylindrical portion 912A, and then linearly extends radially outward in the radial direction. The abutment portion 912B has a rear surface in abutment with a front surface of the sleeve part 231C of the dustproof mechanism accommodating part 231B of the plunger cover 231 and a front surface of the second dustproof mechanism 92.

The elastic body 913 illustrated in FIGS. 4 and 5 has a thickness in frontward/rearward direction, and is made from an elastic material such as rubber and resin. The elastic body 913 has lower-rectangular and upper-circular shape in front view and rear view. In other words, the elastic body 913 has a lower portion having a shape of generally rectangular parallelepiped, and the upper portion and has an upper portion having semicircular shape with a predetermined curvature. Further, a through-hole 913b is formed at a generally center portion of the elastic body 913 such that the through-hole 913b extends throughout a thickness of the elastic body 913 in frontward/rearward direction. The hollow cylindrical portion 912A of the second nipping member 912 and the plunger 7 inserted in the hollow cylindrical portion 912A are inserted in the through-hole 913b. The elastic body 913 includes a main body portion 9130, a first edge portion 913A, a second edge portion 913B, a check valve portion 913C, a first annular protrusion 913D, a second annular protrusion 913E, and a third annular protrusion 913F. The elastic body 913 is an example of a "elastic member" in the present invention.

The main body portion 9130 constitutes a base part of the elastic body 913. As illustrated in FIGS. 4(c), 5(A), and 5(B), the main body portion 9130 has a front portion formed with an annular recessed portion 9130a recessed rearward from a front surface of the main body portion 9130 and having annular shape in front view. Further, as illustrated in FIGS. 4(a), 5(A) and 5(B), the main body portion 9130 has a rear portion formed with a circular recessed portion 9130b recessed frontward from a rear surface of the main body portion 9130 and having circular shape in rear view.

As illustrated in FIG. 4(b), the first edge portion 913A and the second edge portion 913B slightly protrude outward from the main body portion 9130 of the elastic body 913 in a radial direction of the through-hole 913b. Further, as illustrated in FIG. 4(b), a combination of a peripheral surface of the main body portion 9130, the first edge portion 913A, and the second edge portion 913B defines a retaining groove 913a recessed inward in the radial direction of the through-hole 913b.

The check valve portion 913C is configured to allow fluid (air or oil in the depicted embodiment) to flow from an interior of the gear housing 23 to an exterior of the gear housing 23 but prevent the fluid from flowing from the exterior to the interior of the gear housing 23. As illustrated in FIG. 5(A), the check valve portion 913C includes a wall portion 913G and an extension portion 913H. The wall portion 913G is generally hollow cylindrical and extends in frontward/rearward direction forming the through-hole 913b.

The extension portion 913H is positioned at the front portion of the wall portion 913G. The extension portion 913H is inclined inward in the radial direction of the through hole 913b toward a front end of the extension portion 913H. In other words, the extension portion 913H extends toward the axis C of the plunger 7, and is inclined with respect to a direction perpendicular to the extending direction of the axis C of the plunger 7. Incidentally, in a case where no external force is imparted on the extension portion 913H, the frontward inclination angle of the extension portion 913H is an angle α as illustrated in FIG. 5(A).

As illustrated in FIG. 5, the first annular protrusion 913D has a generally annular shape in front view, and protrudes frontward from a bottom surface forming the annular recessed portion 9130a. The second annular protrusion 913E has a generally annular shape in front view, and protrudes frontward from the bottom surface forming the annular recessed portion 9130a. In front view, the second annular protrusion 913E is positioned inward of the first annular protrusion 913D in radial direction of the through-hole 913b.

Further, a first annular groove 913c and a second annular groove 913d are provided by the first annular protrusion 913D and the second annular protrusion 913E protruding from the bottom surface forming the annular recessed portion 9130a. Each of the first annular groove 913c and the second annular groove 913d has a generally annular shape in front view. In front view, the second annular groove 913d is positioned inward of the first annular groove 913c in radial direction of the through-hole 913b. Further, oil is filled in the second annular groove 913d. Incidentally, in the depicted embodiment, a viscous grease is used as the oil. That is, the oil employed in the depicted embodiment has property possessed in non-Newtonian fluid, such that fluidity is changed dependent on a magnitude of applied stress. The second annular groove 913d is an example of a "groove" in the present invention. Oil is an example of "fluid" in the present invention.

Further, as illustrated in FIGS. 4(a) and 4(c), the elastic body 913 is formed with a plurality of through-holes 913e extending throughout a thickness thereof in frontward/rearward direction. In the depicted embodiment, four through-holes 913e are formed. As illustrated in FIG. 4(c), the plurality of through-holes 913e are positioned to overlap with the second annular groove 913d. Hence, as illustrated in FIG. 5(B), the plurality of through-holes 913e are in communication with the second annular groove 913d. Thus, oil filled in the second annular groove 913d can be flowed in the plurality of through-holes 913e.

As illustrated in FIG. 4(a), the third annular protrusion 913F has an annular shape in rear view, and protrudes rearward from the rear surface of the main body portion 9130 (see FIG. 5).

Positional relationship among constituents of the first dustproof mechanism 91 in the gear housing 23 will be described. As illustrated in FIG. 6, the elastic body 913 is nipped between the first nipping member 911 and the second nipping member 912 and is positioned in the gear housing 23. In other words, the first nipping member 911 and the second nipping member 912 support the elastic body 913.

Specifically, the elastic body 913 is accommodated in the gear housing 23 such that the first extending part 23B of the gear housing 23 is positioned in the retaining groove 913a of the elastic body 913. Further, each protruding end of the first annular protrusion 913D and the second annular protrusion 913E is in abutment with the rear surface of the disc portion 911A of the first nipping member 911. Further, a protruding end of the third annular protrusion 913F is in abutment with the front surface of the abutment portion 912B of the second nipping member 912. Further, a lower portion of the elastic body 913 is fitted between the wall of the opening part 23A and the second extending part 23C. With this structure, a position in frontward/rearward direction of the elastic body 913 is fixed.

Further, as illustrated in FIG. 6, an outer peripheral surface of the end portion 911B of the first nipping member 911 is in abutment with an inner peripheral surface forming the annular recessed portion 9130a. Hence, the position of the elastic body 913 in upward/downward direction is fixed.

Further, in a state where the elastic body 913 is positioned in the gear housing 23, the extension portion 913H of the check valve portion 913C is in intimate contact with the outer peripheral surface of the hollow cylindrical portion 912A of the second nipping member 912. In this state, frontward inclination angle of the extension portion 913H becomes greater than the angle α (see FIG. 5(A)).

Further, in a state where external force is not applied to the first dustproof mechanism 91, an isolated space 91a containing the second annular groove 913d and the plurality of through-holes 913e and shut off from an outside of the first dustproof mechanism 91 is provided by the intimate contact of the extension portion 913H with the outer peripheral surface of the hollow cylindrical portion 912A, abutment of the first annular protrusion 913D and the second annular protrusion 913E with the rear surface of the disc portion 911A, and abutment of the third annular protrusion 913F with the front surface of the abutment portion 912B. Further, in the depicted embodiment, in a state where a predetermined external force is applied to the first dustproof mechanism 91, a suction part 91A is formed which allows air (fluid) to flow into the space 91a by the abutment portion 912B of the second nipping member 912 and the third annular protrusion 913F. The suction part 91A is positioned away from the check valve portion 913C. The space 91a is an example of a "space" in the present invention. The suction part 91A is an example of "suction part" or "inhalation part" in the present invention. Air is an example of "fluid" in the present invention.

As illustrated in FIG. 2, the second dustproof mechanism 92 includes a first retaining member 921, a second retaining member 922, an annular member 923, and an O-ring 924. The second dustproof mechanism 92, the first retaining member 921, and the annular member 923 are examples of a "holding part" in the present invention. The annular member 923 and the O-ring 924 are examples of a "sealing part".

The first retaining member 921 is an elastic member made from rubber or resin, and has a generally hollow cylindrical shape extending in frontward/rearward direction. As illustrated in FIG. 6, the first retaining member 921 includes annular protrusions 921A.

The annular protrusion 921A has a generally annular shape in front view. A plurality of the annular protrusions 921A are provided at an outer peripheral surface of the first retaining member 921, and another plurality of the annular protrusions 921A are also provided at a front surface of the first retaining member 921. The first retaining member 921 is force-fitted with the dustproof mechanism accommodating part 231B of the plunger cover 231. Specifically, the position of the first retaining member 921 relative to the plunger cover 231 which is a part of the gear housing 23 is fixed by a pressing force generated by the abutment of the annular protrusions 921A provided at the outer peripheral surface of the first retaining member 921 with the inner peripheral surface of the sleeve part 231C of the dustproof mechanism accommodating part 231B, a pressing force generated by the abutment of the annular protrusions 921A provided at the front surface of the first retaining member 921 with the rear surface of the abutment portion 912B of the second nipping member 912, and the abutment of the rear surface of the first retaining member 921 with the front surface of the second retaining member 922. That is, the position of the first retaining member 921 relative to the plunger cover 231 which is the part of the gear housing 23 is fixed.

Further, the first retaining member 921 has a generally center portion in its diametrical direction formed with a through-hole 921c extending throughout the first retaining member 921 in frontward/rearward direction. The through-hole 921c has a diameter greater than that of the plunger 7, and the plunger 7 is inserted in the through-hole 921c.

Further, the first retaining member 921 has a front portion formed with an annular member accommodating part 921a recessed radially outwardly from an inner peripheral surface of the first retaining member 921 for accommodating therein the annular member 923. Further, the first retaining member 921 has a rear portion formed with an O-ring accommodating part 921b recessed radially outwardly from the inner peripheral surface of the first retaining member 921 for accommodating therein the O-ring 924. The through-hole 921c, the annular member accommodating part 921a, and the O-ring accommodating part 921b are in communication with each other in frontward/rearward direction.

The second retaining member 922 is an elastic member made from rubber or resin, and has a generally hollow cylindrical shape extending in frontward/rearward direction. The second retaining member 922 includes an annular protrusions 922A.

The annular protrusions 922A have generally annular shape in rear view. A single annular protrusion 922A is provided at an outer peripheral surface of the second retaining member 922, and a single annular protrusion 922A is provided at a rear surface of the second retaining member 922. The second retaining member 922 is force-fitted with the dustproof mechanism accommodating part 231B of the plunger cover 231. Specifically, the position of the second retaining member 922 relative to the plunger cover 231 is fixed by a pressing force generated by the abutment of the annular protrusion 922A provided at the outer peripheral surface of the second retaining member 922 with the inner peripheral surface of the sleeve part 231C of the dustproof mechanism accommodating part 231B, a pressing force generated by the abutment of the annular protrusions 922A provided at the rear surface of the second retaining member 922 with the front surface of the bottom part 231D of the dustproof mechanism accommodating part 231B, and the abutment of the front surface of the second retaining member 922 with the rear surface of the first retaining member 921. That is, the position of the second retaining member 922 relative to the plunger cover 231 which is the part of the gear housing 23 is fixed.

Further, the second retaining member 922 has a curved surface 922B. The curved surface 922B has a predetermined curvature facing the outer peripheral surface of the plunger 7, and protrudes toward the outer peripheral surface. With this structure, since the surface of the second retaining member 922 facing the outer peripheral surface of the plunger 7 is curved, in a case where the second retaining member 922 is depressed rearward of the O-ring 924 and is deformed, contact between the second retaining member 922 and the plunger 7 can be suitably restrained, so that the second retaining member 922 is properly deformable. Further, a through-hole 922b extending throughout the second retaining member 922 in frontward/rearward direction is defined by the curved surface 922B. Diameter of the through-hole 922b at a generally center portion in frontward/rearward direction of the second retaining member 922 is greater than the diameter of the plunger 7, the plunder 7 is inserted in the through-hole 922b. The curved surface 922B is an example of a "curved surface" in the present invention.

Further, the second retaining member 922 is formed with a lubrication oil accommodating part 922a. The lubrication oil accommodating part 922a is recessed rearward from a front surface of the second retaining member 922, and has a generally annular shape in front view. The lubrication oil accommodating part 922a and the O-ring accommodating part 921b are not communicated with each other in a state where no or small external force is applied to the second dustproof mechanism 92. That is, the lubrication oil accommodating part 922a provides a closed space to retain lubrication oil in the space when the external force applied to the second dustproof mechanism 92 is sufficiently small. Incidentally, the lubrication oil accommodating part 922a is not necessarily completely closed, but has a structure restraining the lubrication oil from leakage. In the depicted embodiment, the lubrication oil is grease. The lubrication oil is an example of "lubricant" in the present invention. The lubrication oil accommodating part 922a is an example of a "lubricant accommodating part" in the present invention.

Incidentally, the first retaining member 921 and the second retaining member 922 surround the annular member 923 and the O-ring 924 to permit the annular member 923 and the O-ring 924 to contact with the outer peripheral surface of the plunger 7, and constitute a retaining part for retaining the lubrication oil.

In the depicted embodiment, the annular member 923 is made from felt impregnated with oil. The annular member 923 has annular shape having a thickness in frontward/rearward direction, and is accommodated in the annular member accommodating part 921a formed in the first retaining member 921. The annular member 923 is held by the first retaining member 921 so as to contact with the outer peripheral surface of the plunger 7. The annular member 923 surrounds the outer peripheral surface of the plunger 7 to seal the same. The annular member 923 has a front surface in abutment with the rear surface of the abutment portion 912B of the second nipping member 912 of the first dustproof mechanism 91. Further, the annular member 923 has a generally center portion in its radial direction formed with a through-hole 923a extending throughout the annular member 923 in frontward/rearward direction. The through-hole 923a has an inner diameter equal to the outer diameter of the plunger 7, and the plunger 7 is inserted in the through-hole 923a. With such a structure, since the annular member 923 is made from felt, deformation of the O-ring 924 can be restrained in spite of intrusion of iron powders and liquid having high temperature in the gear housing 23 through the opening 23a of the gear housing 23, and hence, lowering of dustproof performance and waterproof performance can be restrained. Further, since oil is impregnated in the felt of the annular member 923, enhanced slidability between the O-ring 924 and the plunger 7 can be provided.

The O-ring 924 is in a form of an elastic member made from rubber or resin. The O-ring 924 is accommodated in the O-ring accommodating part 921b formed in the first retaining member 921. The O-ring 924 surrounds the outer peripheral surface of the plunger 7 to seal the outer peripheral surface. The O-ring 924 is annular in shape. The O-ring 924 has an inner peripheral surface 924a whose diameter is slightly smaller than the outer diameter of the plunger 7. The plunger 7 extends through the inner peripheral surface 924a by the elastic deformation of the O-ring 924 such that the O-ring 924 is in intimate contact with the outer peripheral surface of the plunger 7. Hence, sealability of the O-ring 924 with the outer peripheral surface of the plunger 7 is improved. Incidentally, grease is applied to contacting surfaces between the O-ring 924 and the plunger 7. Hence, the plunger 7 can be properly reciprocally slidably movable relative to the O-ring 924 until the grease becomes dry.

Next, cutting work for cutting a workpiece (for example, metallic pipe) using the saber saw 1 according to the present embodiment, and operation in the saber saw 1 at the time of cutting work will be described with reference to FIGS. 7 through 10.

For performing cutting work, the operator attaches the blade Q to the blade mounting part 8, and pushes the base 23D against the workpiece. In this state, by pulling the trigger 22A, the control unit 5 controls six FETs accommodated in the control box 51, electric power of the battery pack P is supplied to the motor 3, starting rotation of the motor 3. Upon start of rotation of the motor 3, the rotation shaft 31 and the pinion 32 are rotated to start rotation of the bevel gear 610 in meshing engagement with the pinion 32 about the axis B extending in upward/downward direction. Rotation of the bevel gear 610 causes circular movement of the pin 612 about the axis B. Only a component in frontward/rearward direction of the circular movement of the pin 612 is transmitted to the pin guide 71, so that the plunger 7, the pin guide 71, the blade mounting part 8, and the blade Q attached to the blade mounting part 8 are integrally reciprocally moved in the direction of the axis C between a frontmost position (in the following description simply referred to as "front position", see FIGS. 7 and 9) and a rearmost position (in the following description simply referred to as "rear position", see FIGS. 8 and 10).

At the same time, the bevel gear 610 is driven by the pinion 32 in meshing engagement therewith. Since numbers of gear teeth of the bevel gear 610 and numbers of the gear teeth of the counterweight part 62 are equal to each other, the counterweight part 62 is rotated in the direction opposite to the rotational direction of the bevel gear 610 at the angular velocity equal to that of the bevel gear 610. In accordance with the rotations of the bevel gear 610 and the counterweight part 62, the center of gravity of the transmission gear part 61 and the center of gravity of the counterweight part 62 perform circular movement in mutually opposite directions about the axis B at equal angular velocity.

Here, when the switch part 235 is at the depressing posture, the switch part 235 presses the rear portion of the plunger cover 231 upward, so that separating state between the upper end of the orbital guide 611 and the bearing 233 is maintained. Hence, pivotal movement of the plunger cover 231 and the plunger 7 about the pivot shaft 231A does not occur. In other words, at the depressing posture of the switch part 235, inclination of the axis C passing through the axis of the plunger 7 relative to the frontward/rearward direction (a horizontal axis O) is maintained by the predetermined angle is maintained, and the plunger 7 is reciprocally moved in frontward/rearward direction along the axis C.

On the other hand, when the switch part 235 is at the releasing posture, the outer race of the bearing 233 is in abutment with the upper end of the orbital guide 611 while the outer race is rotated, so that the outer race is reciprocally moved in upward/downward direction following the shape of the upper end of the orbital guide 611. In response to the reciprocating movement in upward/downward direction of the bearing 233, the plunger cover 231 of the gear housing 23 and the plunger 7 are pivotally moved in upward/downward direction about the axis of the pivot shaft 231A. Hence, during cutting operation to the workpiece, the blade Q performs elliptic motion, so called, orbital motion (see FIG. 11). Thus, the blade Q vigorously intrudes on the workpiece when the blade Q is moved rearward, thereby improving work efficiency. Incidentally, the inner peripheral surface of the opening 23a is spaced away from the plunger 7 so as to secure pivotally moving space of the plunger 7.

Figure 11:
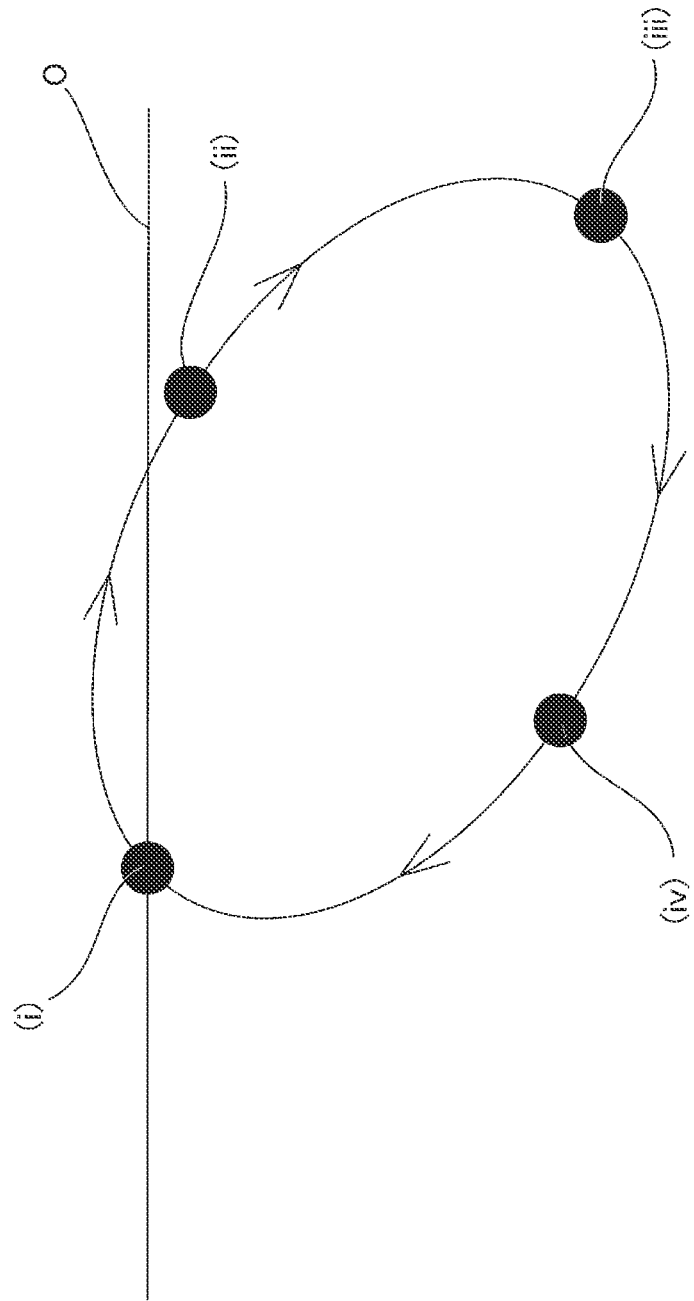
FIG. 11 is a schematic view for description of movement of a tip end portion of the plunger relative to the main body case of a gear housing in a case where the switch part has the released posture in the saber saw during its operational state.

Next, effect attendant to the provision of the first dustproof mechanism 91 in the saber saw 1 according to the depicted embodiment will be described with reference to FIGS. 11 through 15. FIG. 11 is a schematic view illustrating motion of the tip end (indicated by dots in FIG. 11) of the plunger 7 relative to the main body case 230 of the gear housing 23 during cutting operation when the switch part 235 is at the releasing posture. The horizontal axis O is parallel to frontward/rearward direction.

Figure 12:
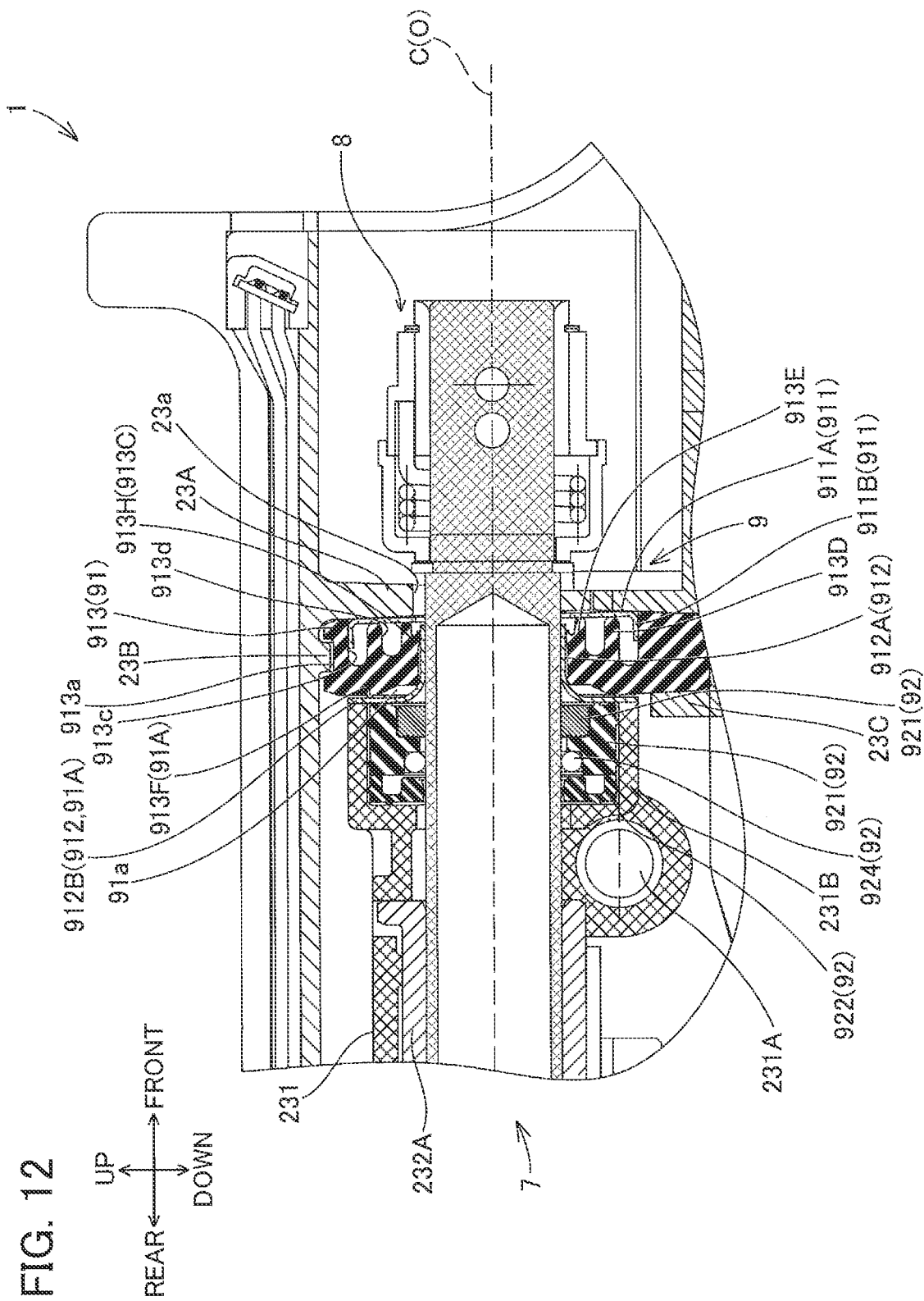
FIG. 12 is a detailed cross-sectional view illustrating the front portion of the plunger, the blade mounting part, the dustproof mechanism part, and its ambient portion when the tip end portion of the plunger is at a point (i) in FIG. 11.

When the tip end of the plunger 7 is at a position (i) indicated in FIG. 11, the axis C is parallel to the horizontal axis O as illustrated in FIG. 12. From this state, the tip end of the plunger 7 ascends diagonally frontward from the position (i) and then descends to a position (ii) in FIG. 11.

Figure 13:
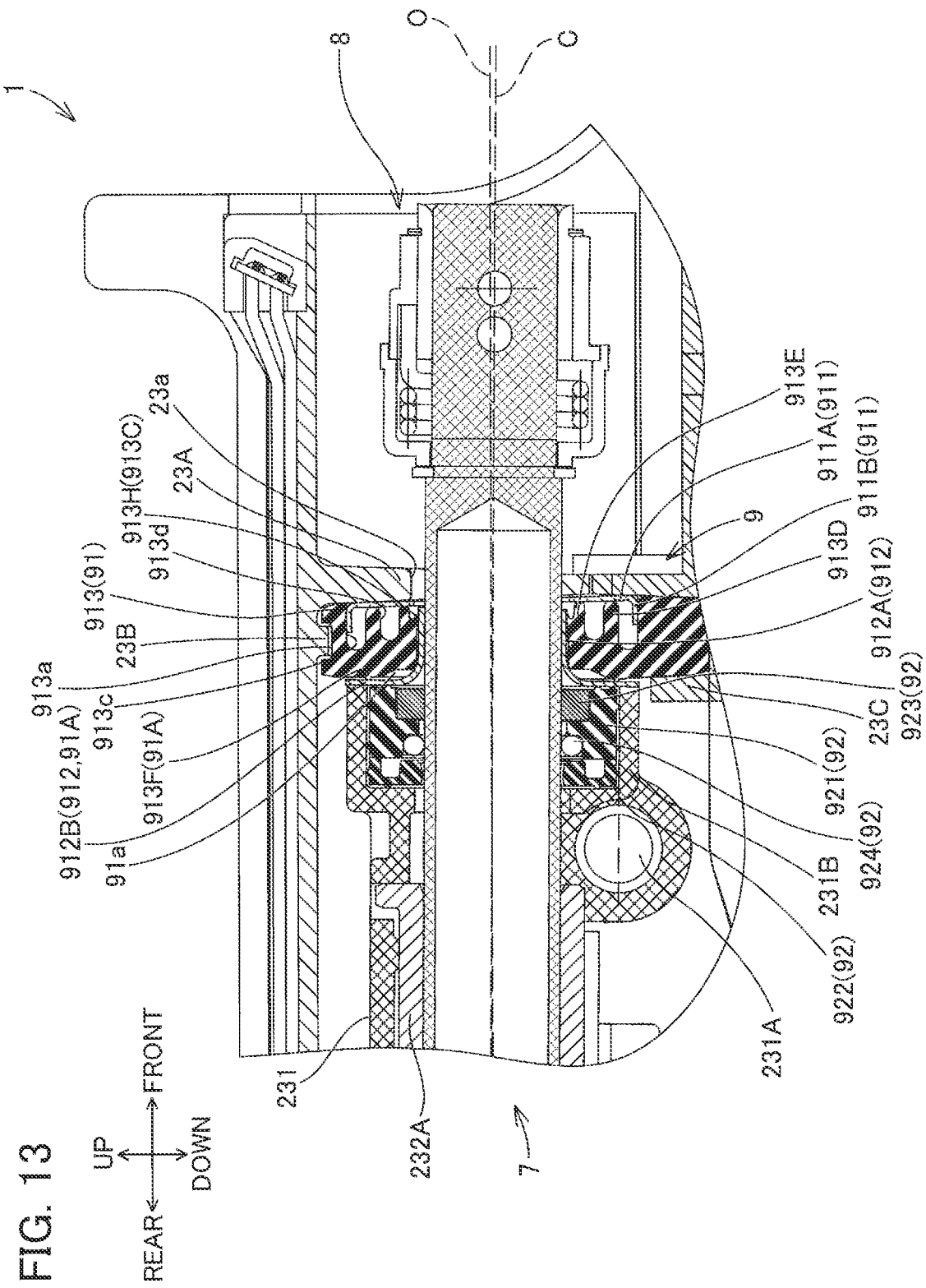
FIG. 13 is a detailed cross-sectional view illustrating the front portion of the plunger, the blade mounting part, the dustproof mechanism part, and its ambient portion when the tip end portion of the plunger is at a point (ii) in FIG. 11.

FIG. 13 corresponds to a position (ii) in FIG. 11, and illustrates the states of the dustproof mechanism part 9 and its ambient portions when the tip end of the plunger 7 is descending with respect to the main body case 230. The tip end of the plunger 7 is moved in upward/downward direction by the pivotal movement of the plunger 7 about the pivot shaft 231A of the plunger cover 231. As illustrated in FIG. 12, in case of the downward movement of the tip end of the plunger 7, the rear portion of the plunger 7 is lifted upward so that the axis C of the plunger 7 is inclined with respect to the horizontal axis O. At this time, the second nipping member 912 through the plunger 7 extends and the plunger cover 231 are also pivotally moved together with the plunger 7. In the process from the state in FIG. 12 to the state in FIG. 13 (in the process from the position (i) to the position (ii) in FIG. 11), the plunger 7, the plunger cover 231, and the second nipping member 912 are pivotally moved relative to the main body case 230 in clockwise direction in FIGS. 12 and 13.

In this state, in the upper portion of the first dustproof mechanism 91, the hollow cylindrical portion 912A of the second nipping member 912 is subjected to pressing force from the outer peripheral surface of the plunger 7, the pressing force urging the hollow cylindrical portion 912A to rotate in clockwise direction. Hence, the hollow cylindrical portion 912A presses against the rear portion of the wall portion 913G of the check valve portion 913C upward. Further, the abutment portion 912B of the second nipping member 912 is urged to be rotated in clockwise direction, and the abutment portion 912B is pressed frontward by the front end surface of the dustproof mechanism accommodating part 231B of the plunger cover 231. Hence, the abutment portion 912B presses against the rear portion of the second nipping member 912 frontward with the abutment portion 912B being in contact with the third annular protrusion 913F. Thus, the elastic body 913 is elastically deformed to reduce a volume of the space 91a. In accordance with reduction in the volume of the space 91a, an increase in pressure in the space 91a is started.

Further, in the lower portion of the first dustproof mechanism 91, the hollow cylindrical portion 912A of the second nipping member 912 is subjected to pressing force from the outer peripheral surface of the plunger 7, the pressing force urging the hollow cylindrical portion 912A to rotate in clockwise direction. Hence, the hollow cylindrical portion 912A presses against the front portion of the wall portion 913G of the check valve portion 913C downward. Thus, the elastic body 913 is elastically deformed to reduce the volume of the space 91a. In accordance with reduction in the volume of the space 91a, an increase in pressure in the space 91a is started.

Figure 14:
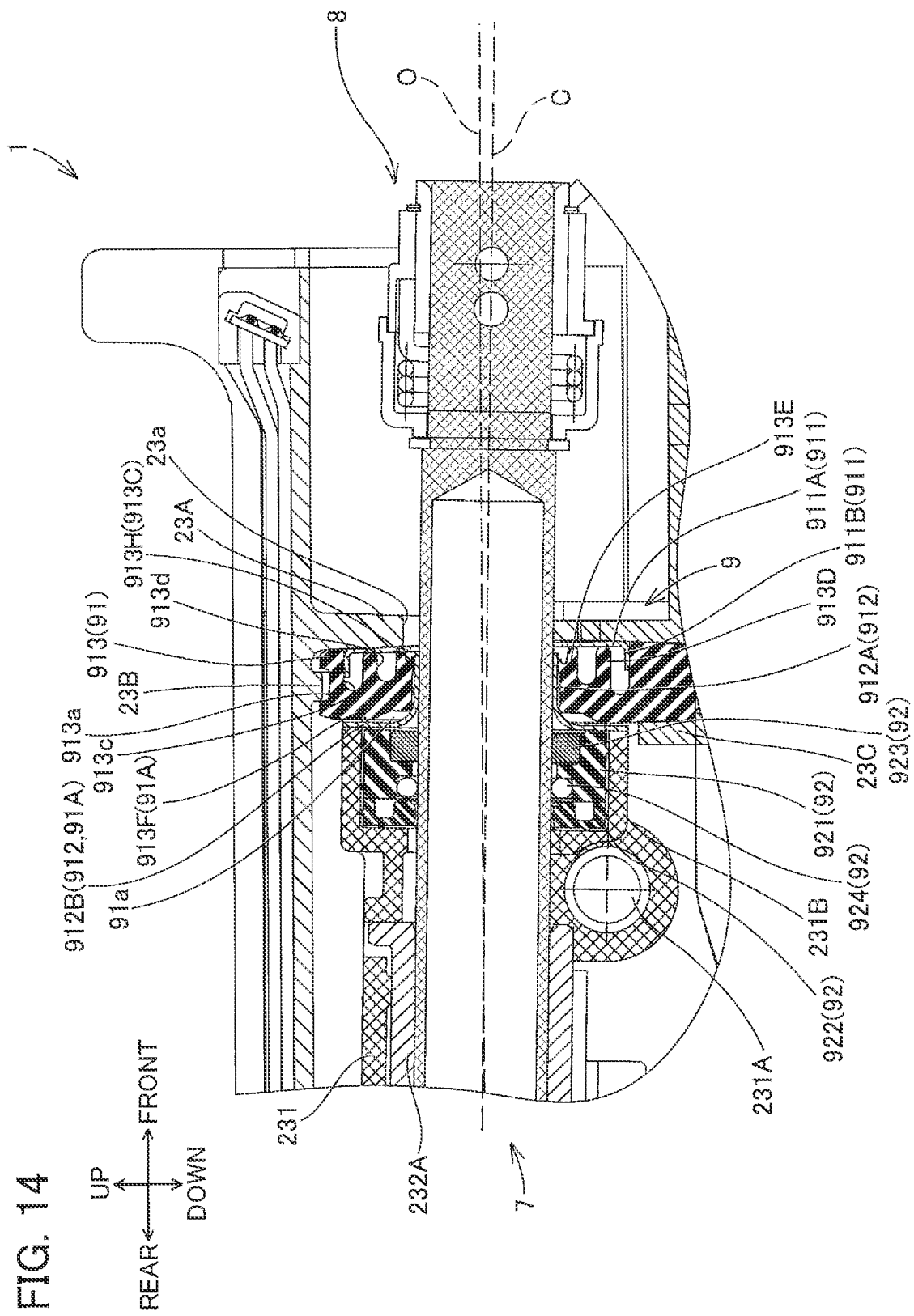
FIG. 14 is a detailed cross-sectional view illustrating the front portion of the plunger, the blade mounting part, the dustproof mechanism part, and its ambient portion when the tip end portion of the plunger is at a point (iii) in FIG. 11.

From this state, when the tip end of the plunger 7 is further moved downward relative to the main body case 230 as illustrated in FIG. 14 (position (iii) in FIG. 11), in the upper portion of the first dustproof mechanism 91, the hollow cylindrical portion 912A of the second nipping member 912 further presses against the rear portion of the wall portion 913G of the check valve portion 913C further upward, and the abutment portion 912B further presses against the rear portion of the elastic body 913 further upward. Further, in the lower portion of the first dustproof mechanism 91, the hollow cylindrical portion 912A further presses against the front portion of the wall portion 913G further downward. Hence, the elastic body 913 is further resiliently deformed, to further reduce the volume of the space 91a. In accordance with further reduction in the volume of the space 91a, the pressure in the space 91a is further increased.

At this time, the pressure in the space 91a exceeds a predetermined level, so that air in the space and the oil filled in the second annular groove 913d are discharged from the 913C through the through-hole 913e. Specifically, when the pressure exceeds the predetermined level, the extension portion 913H of the check valve portion 913C is pivotally moved frontward and in clockwise direction, so that a gap is generated between the extension portion 913H and the outer peripheral surface of the hollow cylindrical portion 912A. Hence, air or oil (or both air and oil) is discharged through the gap. Incidentally, after the discharge of the air or oil, the extension portion 913H is immediately pivotally moved in counterclockwise direction providing intimate contact with the outer peripheral surface of the hollow cylindrical portion 912A. Accordingly, entry of dust into the space 91a can be prevented.

In this way, the first dustproof mechanism 91 is configured to discharge air and oil outside of the housing 2 by the deformation of the first dustproof mechanism 91 due to the application of external force thereto caused by the driving movement of the plunger 7. Therefore, the air and oil (grease) discharged outside from the opening 23a can effectively prevent dust from entering into the housing 2, even if dust is likely to enter into the housing 2 through the opening 23a during cutting operation (during driving of the plunger 7). Accordingly, entry of dust generated during the cutting operation into the housing 2 can be effectively prevented. Particularly, the opening 23a is largely opened in size in order to ensure pivotally movable range of the plunger 7 in the orbital mechanism, and hence, dust is likely to enter into the housing 2 through the opening 23a. However, since the oil (grease) is sent to the opening 23a, the oil is accumulated in the interior of the opening 23a and an ambient portion thereto, generating an oil lid (seal) at the opening 23a. Therefore, oil having high viscosity (grease) copes with the pivotal movement of the plunger 7, and closes the opening 23a by its viscous fluidity. Thus, infiltration of the dust into the housing 2 can be effectively prevented. As such, according to the present embodiment, since the oil (grease) can be utilized as a sealing agent coping with the opening 23a that is opened for orbital mechanism, entry of the dust into the housing 2 can be prevented.

Further, as described above, the check valve portion 913C allows air to flow from the interior of the housing 2 to the outside of the housing but prevent air to flow from the outside to the inside of the housing 2. Hence, entry of the dust generated in the cutting operation into the housing 2 can be suitably prevented.

Further, in accordance with reduction in volume of the space 91a because of deformation of the check valve portion 913C in response to application of external force to the elastic body 913, air and oil in the space 91a are discharged outside of the housing 2. Hence, entry of the dust generated in the cutting operation into the housing 2 can be suitably prevented.

Figure 15:
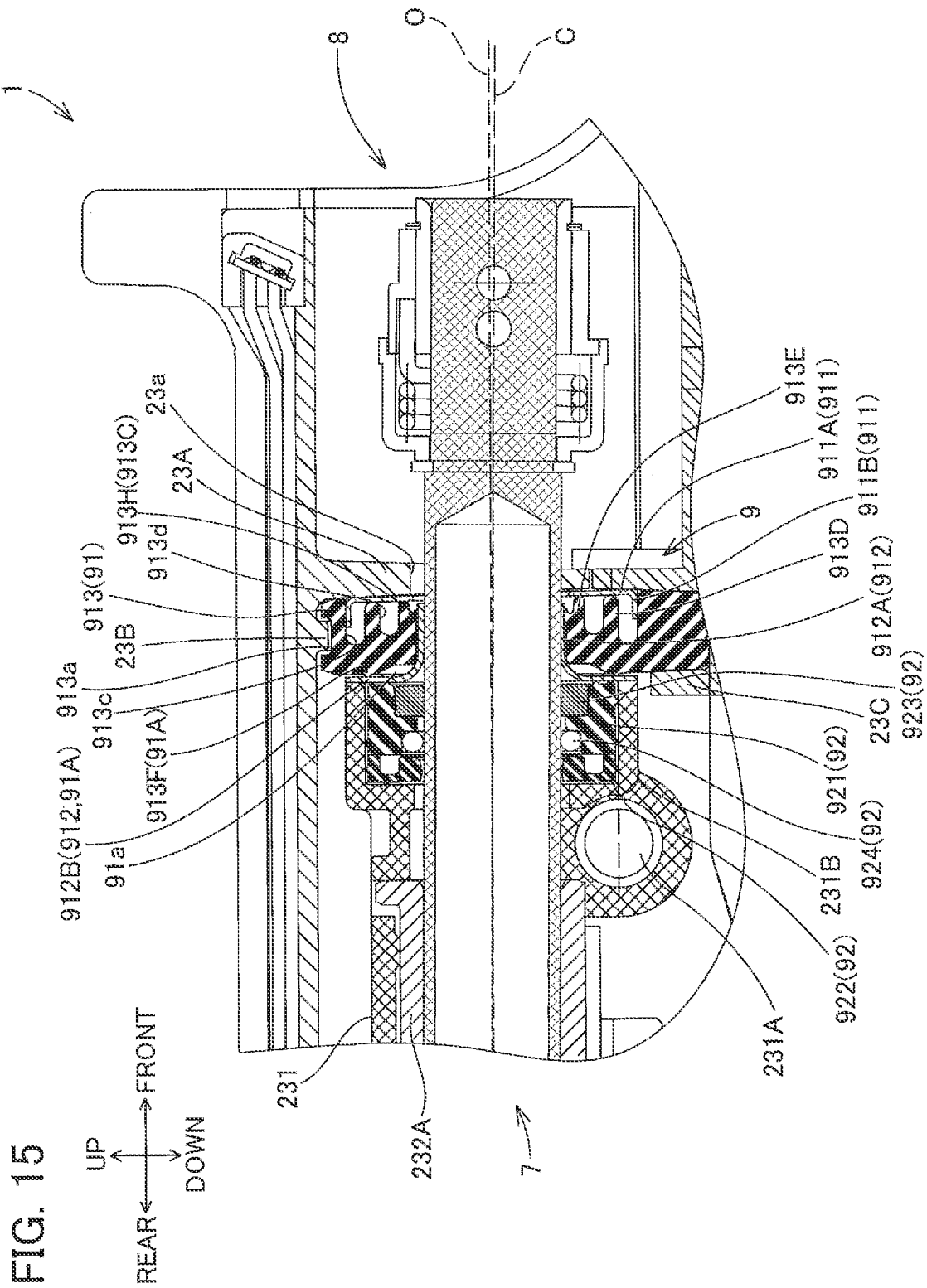
FIG. 15 is a detailed cross-sectional view illustrating the front portion of the plunger, the blade mounting part, the dustproof mechanism part, and its ambient portion when the tip end portion of the plunger is at a point (iv) in FIG. 11.

As illustrated in FIG. 15 (position (iv) in FIG. 11), when the tip end of the plunger 7 is moved upward from the lower portion, the plunger 7, the plunger cover 231, and the second nipping member 912 are integrally pivotally moved in counterclockwise direction in FIG. 14. At this time, in the upper portion of the first dustproof mechanism 91, the upward pressure to the rear portion of the wall portion 913G of the check valve portion 913C of the elastic body 913 from the hollow cylindrical portion 912A of the second nipping member 912 and the pressure applied to the rear portion of the elastic body 913 from the abutment portion 912B are mitigated. Further, in the lower portion of the first dustproof mechanism 91, downward pressure applied to the front portion of the wall portion 913G of the check valve portion 913C of the elastic body 913 from the hollow cylindrical portion 912A is mitigated. Hence, the elastic body 913 is elastically deformed to restore its original shape to increase the volume of the space 91a. In accordance with the increase in volume of the space 91a, pressure in the space 91a becomes lowered.

When the pressure in the space 91a becomes lower than the predetermined value, air is introduced through the suction part 91A. Specifically, abutment of the front surface of the abutment portion 912B of the second nipping member 912 with the third annular protrusion 913F of the elastic body 913 is released to generate a gap, so that air in the main body case 230 is flowed into the first dustproof mechanism 91 through the gap. Incidentally, at this time, since the extension portion 913H of the check valve portion 913C is in intimate contact with the outer peripheral surface of the hollow cylindrical portion 912A, entry of dust into the main body case 230 through the check valve portion 913C is prevented.

Next, effect attendant to the provision of the second dustproof mechanism 92 in the saber saw 1 according to the depicted embodiment will be described in detail with reference to FIGS. 16 through 20. Incidentally, since the effect attendant to the second dustproof mechanism 92 is exhibited by the reciprocating movement in frontward/rearward direction of the plunger 7, FIGS. 16 through 20 take no account of inclination of the axis C of the plunger 7 with respect to the horizontal axis O during cutting operation. Those skilled in the art would have understanding that the similar effect described below according to the present invention is attainable even in a case where the plunger 7 is pivotally moved in upward/downward direction about the axis of the pivot shaft 231A of the plunger cover 231.

As described above, since the grease is coated beforehand on the contacting surfaces between the O-ring 924 and the plunger 7, the plunger 7 is fundamentally suitably slidably movable relative to the O-ring 924 accommodated in the O-ring accommodating part 921b of the first retaining member 921.

However, in a case where the oil (grease) coated beforehand is reduced or vanished due to continuous operation, friction between the O-ring 924 and the plunger 7 is increased so that the O-ring 924 is likely to be worn. The O-ring 924 may be damaged at an early stage by leaving this situation unchanged thereby lowering dustproof performance.

Figure 16:
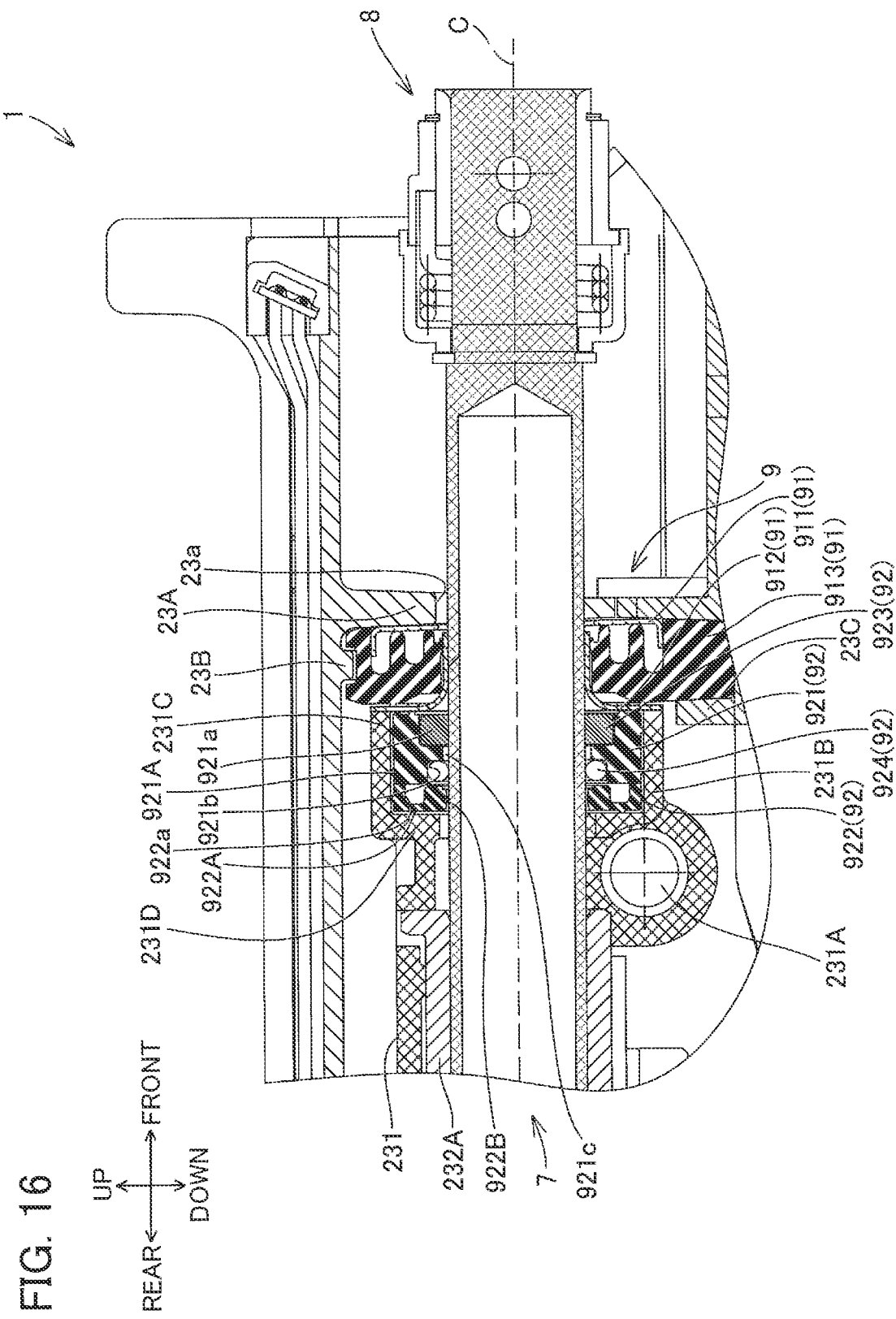
FIG. 16 is a view for description of an effect of a second dustproof mechanism in the dustproof mechanism part of the saber saw according to the first embodiment of the present invention, and particularly illustrating a state where the blade mounting part is positioned at the frontward position.
Figure 17:
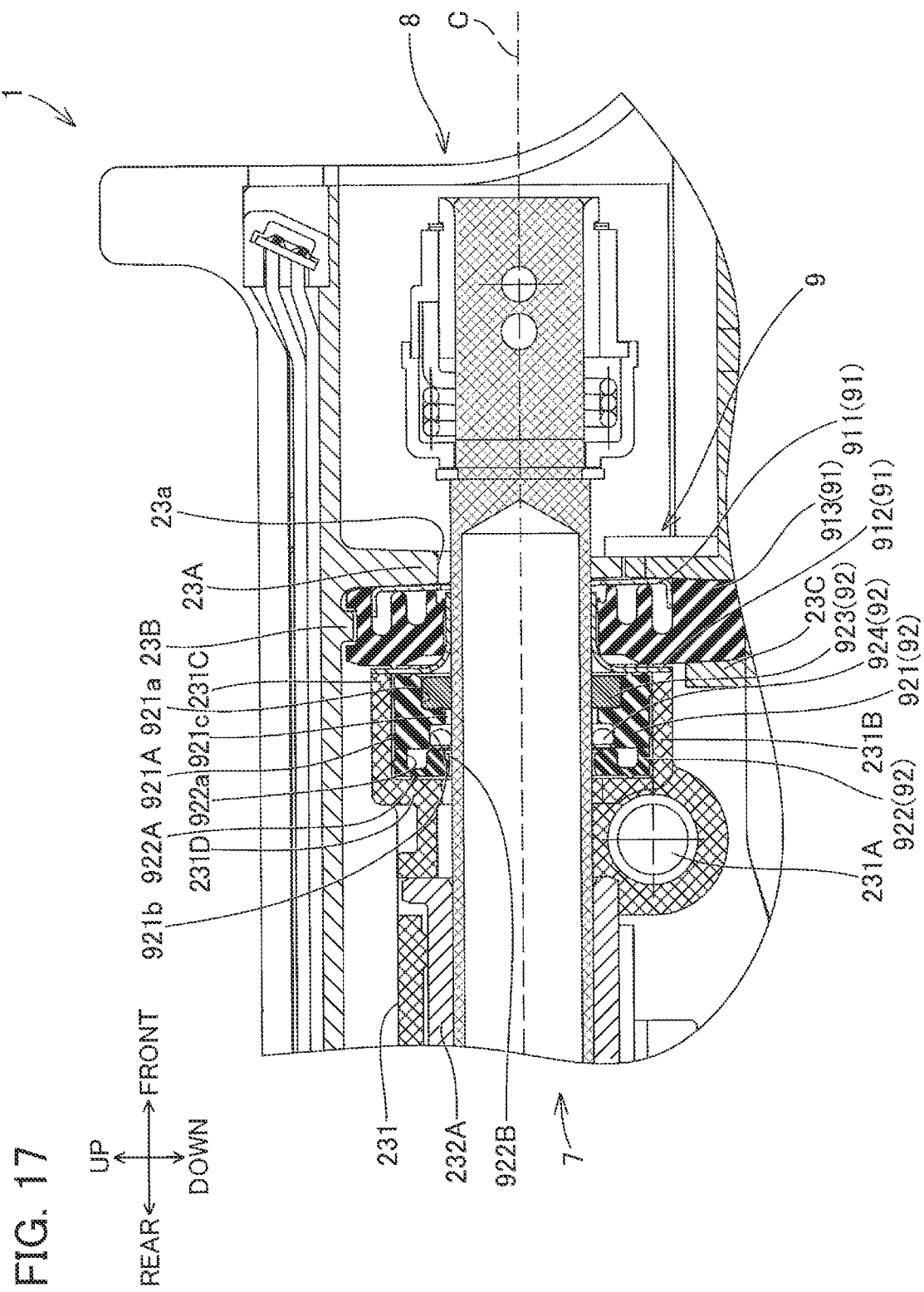
FIG. 17 is a view for description of the effect of the second dustproof mechanism in the dustproof mechanism part of the saber saw according to the first embodiment of the present invention, and particularly illustrating a state where the blade mounting part is moving from the frontward position toward the rearward position.

According to the present embodiment, in a case where the plunger 7 and the blade mounting part 8 are moving rearward as illustrated in FIG. 17 from the front position illustrated in FIG. 16, the O-ring 924 is moved rearward integrally with the plunger 7 because of the frictional force generated between the outer peripheral surface of the plunger 7 and the O-ring 924. That is, the O-ring 924 is moved within the plunger cover 231 by receiving driving force from the plunger 7.

In this state, the O-ring 924 presses against the radially inner portion of the front surface of the second retaining member 922, since the position of the second retaining member 922 is fixed relative to the plunger cover 231. At this time, the second retaining member 922 is elastically deformed.

Figure 18:
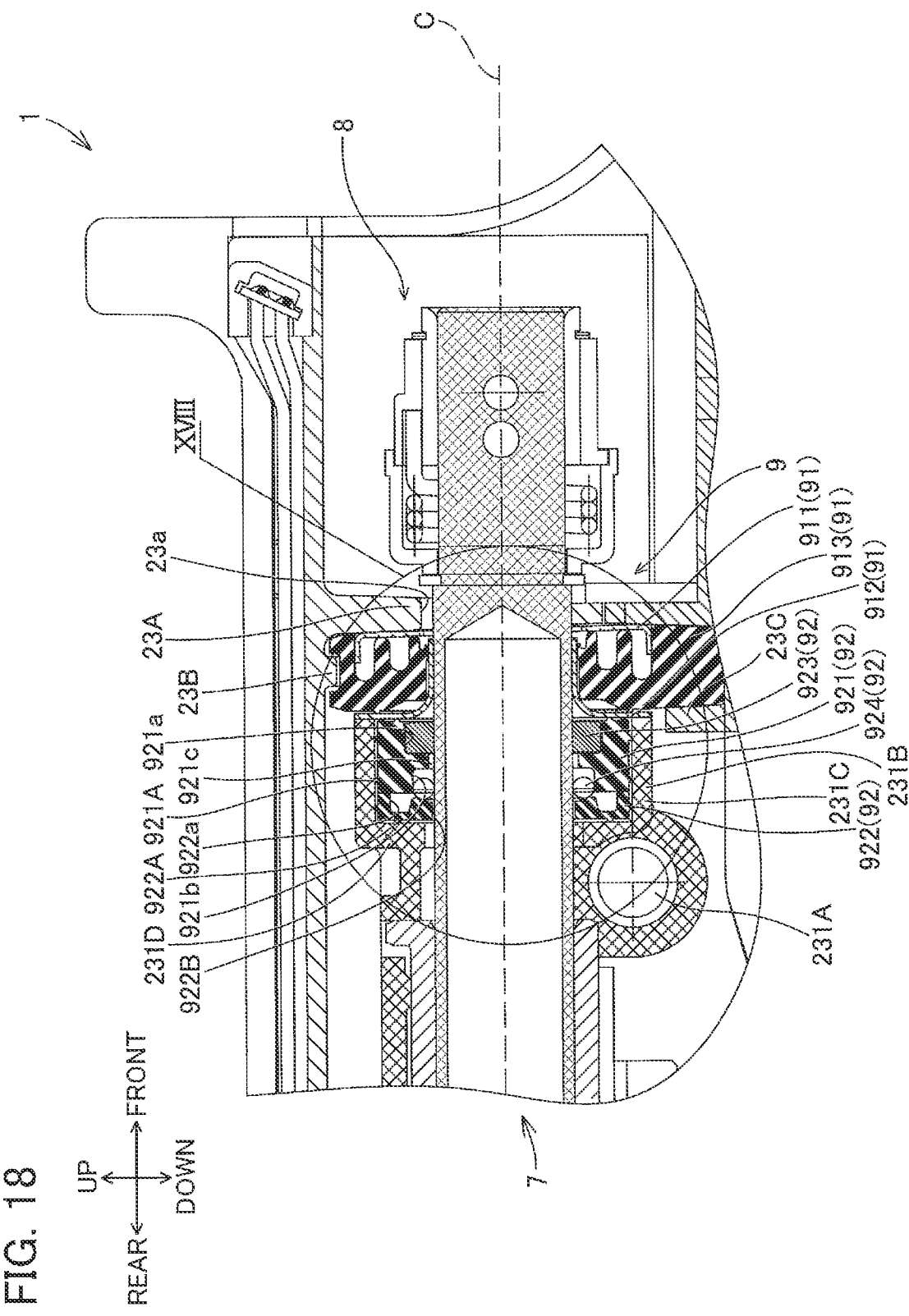
FIG. 18 is a view for description of the effect of the second dustproof mechanism in the dustproof mechanism part of the saber saw according to the first embodiment of the present invention, and particularly illustrating a state where the blade mounting part is positioned at the rearward position.
Figure 19:
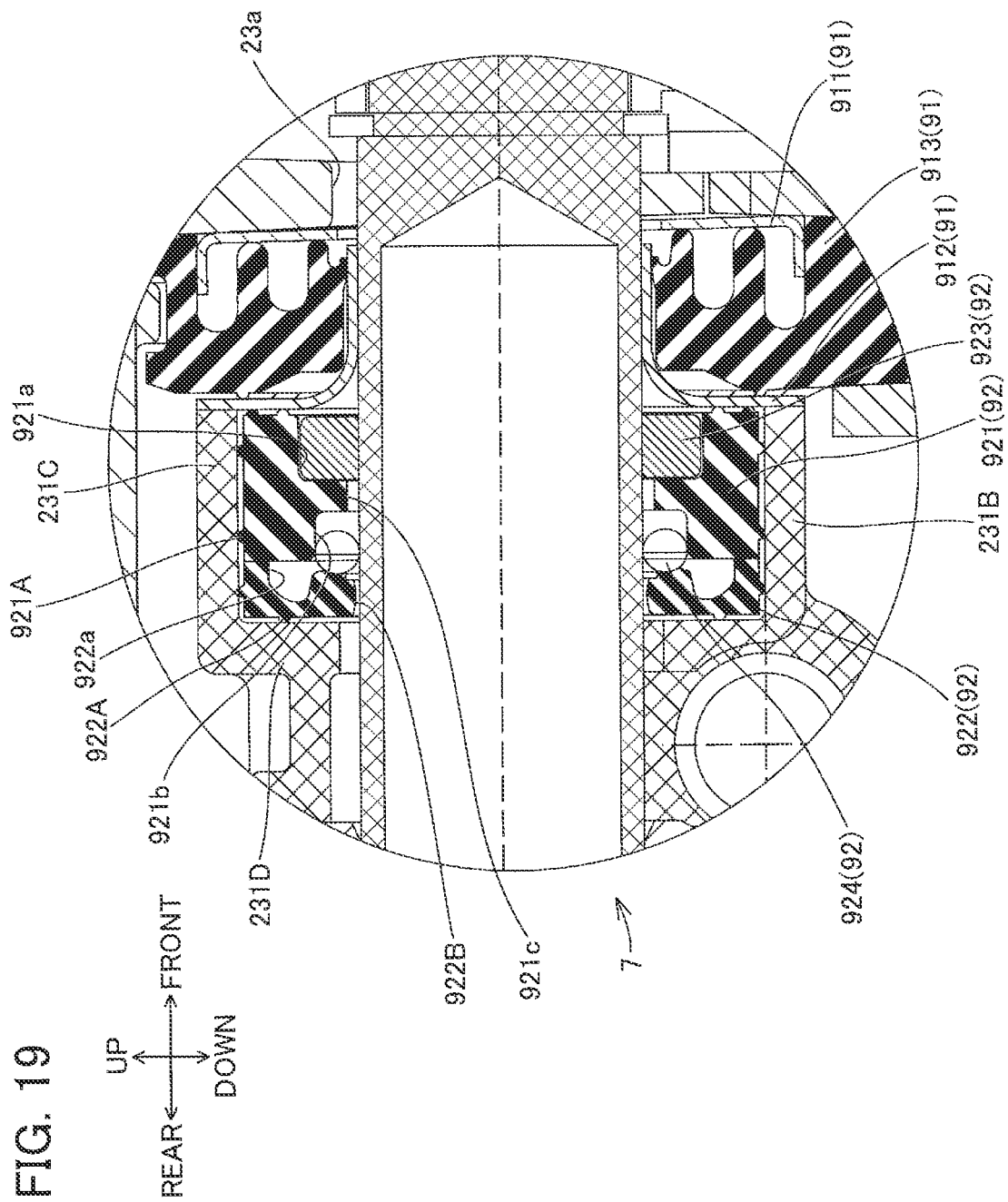
FIG. 19 is an enlarged view illustrating a portion XVIII in FIG. 18.

From this state, when the plunger 7 and the blade mounting part 8 are further moved rearward and are positioned at the rear position as illustrated in FIGS. 18 and 19, the second retaining member 922 is further elastically deformed from the state illustrated in FIG. 17. Incidentally, in an enlarged view of FIG. 19, resilient deformation of the second retaining member 922 is delineated in more detail. At this time, the lubrication oil accommodating part 922a of the second retaining member 922, the O-ring accommodating part 921b of the first retaining member 921, the through-hole 921c, and the annular member accommodating part 921a are communicated with each other. In other words, a passage communicating between the lubrication oil accommodating part 922a and the outer peripheral surface of the plunger 7 is formed. Further, a part of the lubrication oil accommodating part 922a retaining therein the lubrication oil is elastically deformed by the displacement of the O-ring 924. Hence, a force is applied to the lubrication oil retained in the lubrication oil accommodating part 922a, the lubrication oil having high viscosity can be displaced to the outer peripheral surface of the plunger 7. As such, the lubrication oil can be moved (flowed) and supplied to the O-ring accommodating part 921b and the annular member accommodating part 921a, since the passage communicating between the lubrication oil accommodating part 922a and the outer peripheral surface of the plunger 7 is formed by the displacement of the O-ring 924 caused by the plunger 7, and the part of the lubrication oil accommodating part 922a retaining the lubrication oil is elastically deformed. The lubrication oil supplied to the O-ring accommodating part 921b is adhered to the contact surfaces of the O-ring 924 and the plunger 7. Hence, the plunger 7 can be properly reciprocally slidably movable with respect to the O-ring 924. Further, the lubrication oil is also supplied to the annular member 923 accommodated in the annular member accommodating part 921a to efficiently enhance slidability between the O-ring 924 and the plunger 7. Incidentally, the depicted embodiment provides a structure for suitably moving the lubrication oil by the combination of the formation of the passage communicating between the lubrication oil accommodating part 922a and the outer peripheral surface of the plunger 7 and elastic deformation of the part of the lubrication oil accommodating part 922a retaining the lubrication oil. However, only one of the formation of the passage and the elastic deformation of the part can exhibit the technical effect. That is, a structure for forming or enlarging the passage communicating between the lubrication oil accommodating part 922a and the outer peripheral surface of the plunger 7 by the external force applied from the plunger 7 as the drive shaft may be available. In this case, even if elastic deformation of the lubrication oil accommodating part 922a does not occur, a lubrication oil having low viscosity can be moved to the outer peripheral surface of the plunger 7 because of its fluidity. Further, a structure for elastically deforming at least a part of the lubrication oil accommodating part 922a retaining the lubrication oil by the external force from the plunger 7 may be available. In this case, even if no change occurs with respect to a passage communicating between the lubrication oil accommodating part 922a and the outer peripheral surface of the plunger 7, the lubrication oil can be moved to the outer peripheral surface of the plunger 7 by the force transmitted by the elastic deformation.

Figure 20:
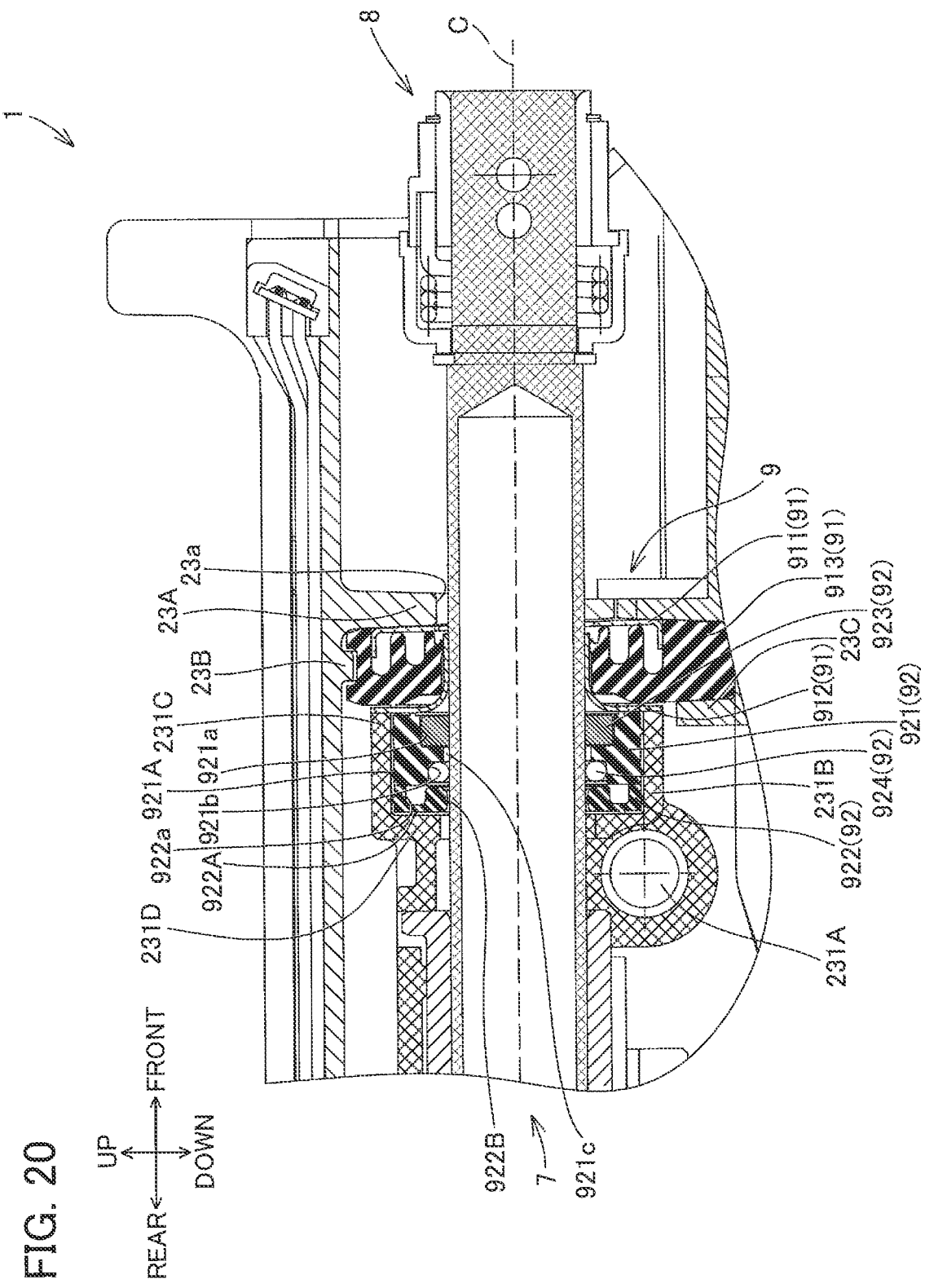
FIG. 20 is a view for description of the effect of the second dustproof mechanism in the dustproof mechanism part of the saber saw according to the first embodiment of the present invention, and particularly illustrating a state where the position of the blade mounting part is restored to the frontward position from the rearward position.

Then, as illustrated in FIG. 20, in a case where the plunger 7 and the blade mounting part 8 are moved frontward, the O-ring 924 is pressed frontward by the elastic force accompanying restoration of original shape of the second retaining member 922, so that the position of the O-ring 924 is restored in the O-ring accommodating part 921b of the first retaining member 921.

As described above, in accordance with the pressure from the O-ring 924 to the second retaining member 922 by the driving movement of the plunger 7, the lubricant is supplied to the portion between the O-ring 924 and the outer peripheral surface of the plunger 7. Therefore, degradation (frictional wearing) of the O-ring 924 can be restrained. Hence, entry of the dust generated during cutting operation into the housing 2 can be suitably prevented. Particularly, since the lubricant can be supplied at a timing where the lubricant ambient to the O-ring 924 is insufficient, proper amount of lubricant can be supplied to the portion ambient to the O-ring 924 at a proper time.

Figure 22:
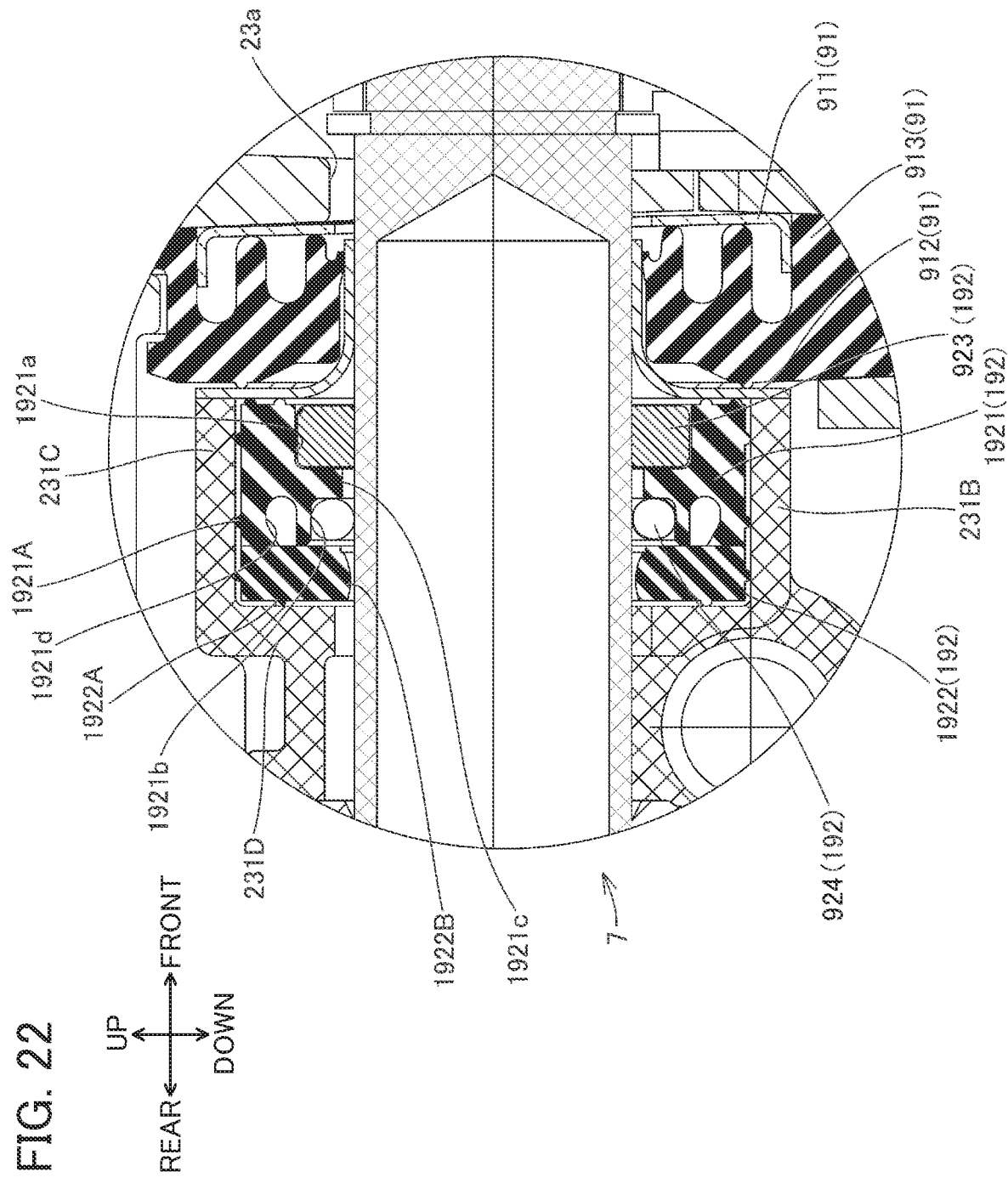
FIG. 22 is an enlarged view illustrating a portion XXII in FIG. 21.
Figure 23:
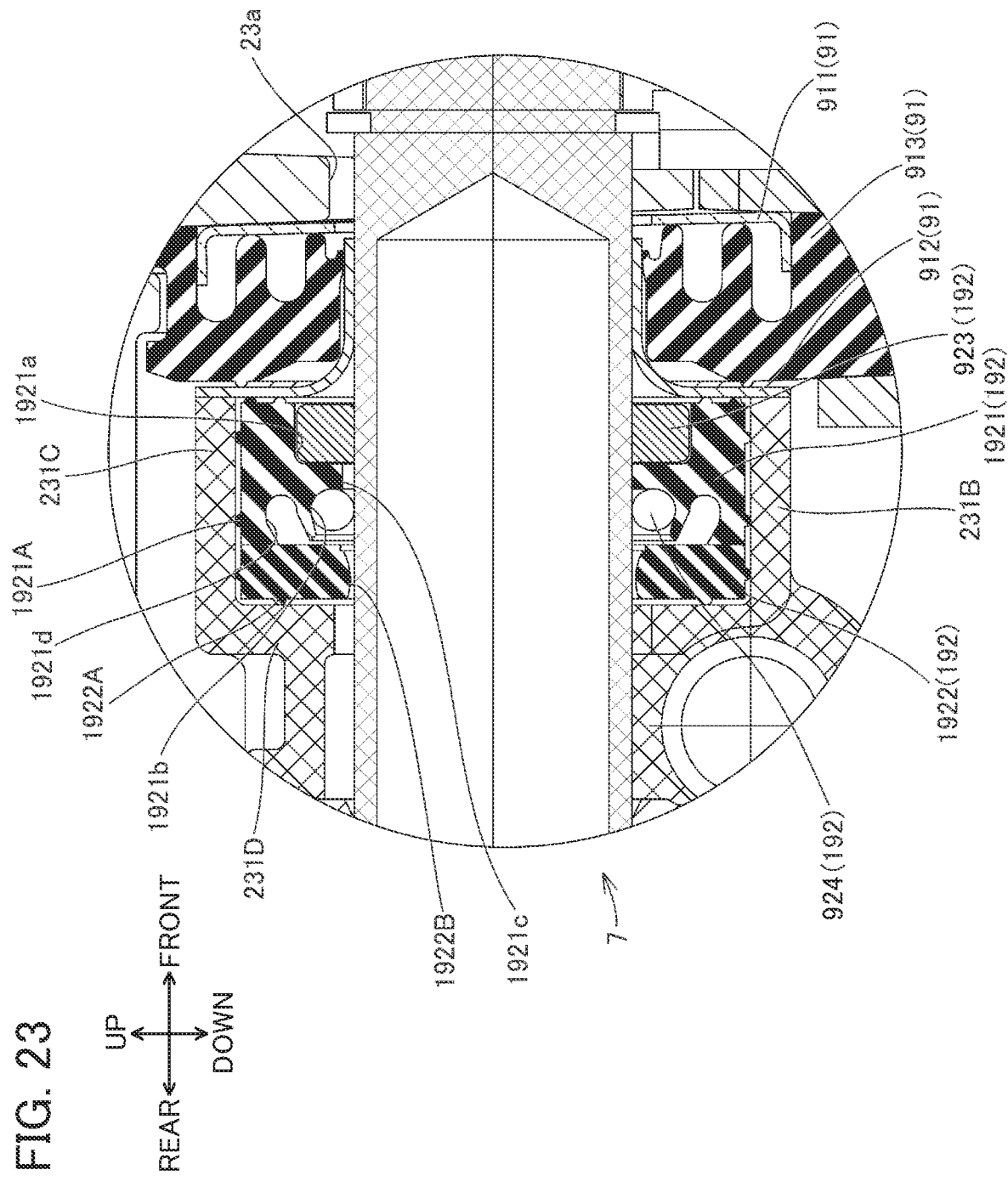
FIG. 23 is a detailed cross-sectional view illustrating the dustproof mechanism part and its ambient portion for description of an effect of the saber saw according to the second embodiment of the present invention.

Next, a saber saw 100 as an example of a powered tool according to a second embodiment of the present invention will be described with reference to FIGS. 21 through 23. The saber saw 100 has a structure fundamentally the same as that of the saber saw 1 according to the first embodiment, so the like parts and components are designated by the same reference numerals as those of the first embodiment to avoid duplicating description. A structure of the second embodiment different from the first embodiment and a structure of the second embodiment to be described in detail will be described. Further, the structure identical to the structure of the saber saw 1 exhibits an effect the same as the effect described above.

Figure 21:
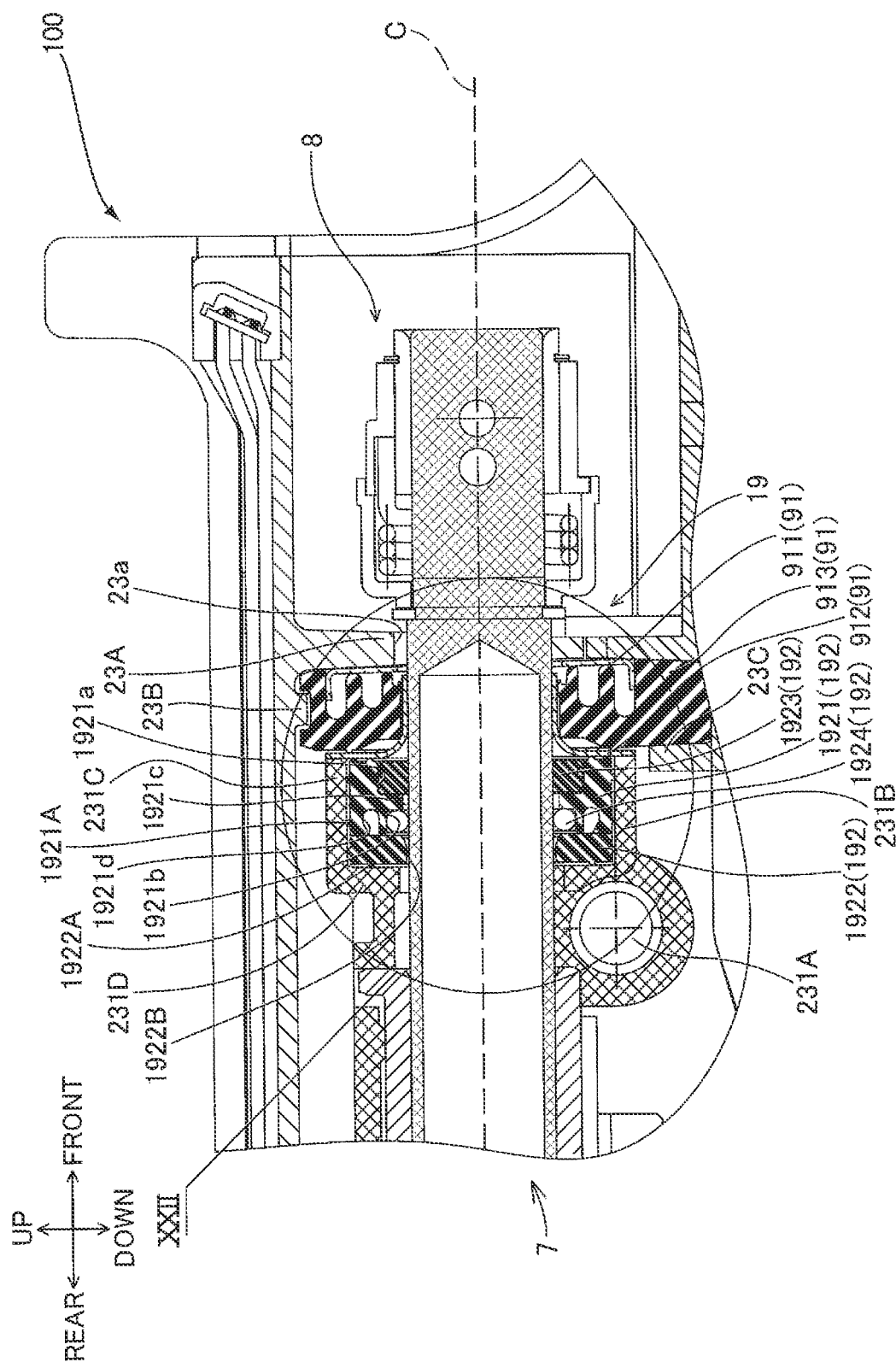
FIG. 21 is detailed cross-sectional view illustrating a front portion of a plunger, a blade mounting part, a dustproof mechanism part, and its ambient portion in a saber saw according to a second embodiment of the present invention.

As illustrated in FIG. 21, in the saber saw 100 according to the second embodiment, a second dustproof mechanism 192 is provided instead of the second dustproof mechanism 92. The second dustproof mechanism 192 includes a first retaining member 1921 and a second retaining member 1922. The second retaining member 1922 is different from the second retaining member 922 of the saber saw 1 in that the second retaining member 1922 does not include the lubrication oil accommodating part 922a. Remaining construction of the second retaining member 1922 is the same as that of the second retaining member 922. Thus, further description as to the second retaining member 1922 will be omitted.

The first retaining member 1921 includes a lubrication oil retaining portion 1921d. Incidentally, the first retaining member 1921 has a structure the same as that of the first retaining member 921 of the saber saw 1 according to the first embodiment other than the lubrication oil retaining portion 1921d. Thus, further description as to the structure of the first retaining member will be omitted.

With the structure described above, as illustrated in FIGS. 22 and 23, in a case where the plunger 7 and the blade mounting part 8 are moved frontward, the O-ring 924 is displaced frontward integrally with the plunger 7 because of the frictional force generated between the outer peripheral surface of the plunger 7 and the O-ring 924.

In this state, since the position of the first retaining member 1921 is fixed relative to the plunger cover 231, the O-ring 924 presses against the radially inner portion of a rear surface of the first retaining member 1921 frontward with a predetermined pressing force. At this time, the first retaining member 1921 is elastically deformed, so that the lubrication oil retaining portion 1921d of the first retaining member 1921, the O-ring accommodating part 921b, a through-hole 1921c, and an annular member accommodating part 1921a are communicated with each other. Hence, the lubrication oil retained in the lubrication oil retaining portion 1921d is supplied to the O-ring accommodating part 1921b and the annular member accommodating part 1921a. Specifically, the lubrication oil is supplied to the contacting surfaces of the O-ring 924 and the plunger 7. Hence, suitable reciprocating sliding movement of the plunger 7 relative to the O-ring 924 can be realized. Further, the lubrication oil is also supplied to the annular member 923 accommodated in the annular member accommodating part 1921a, thereby efficiently enhancing slidability between the O-ring 924 and the plunger 7.

As described above, the lubrication oil is supplied to the portion between the O-ring 924 and the outer peripheral surface of the plunger 7 by the pressure from the O-ring 924 to the first retaining member 1921 in accordance with the driving movement of the plunger 7. Therefore, degradation (frictional wearing) of the O-ring can be restrained. Accordingly, entry of the dust generated during cutting operation into the housing 2 can be suitably restrained.

While the present invention has been described with reference to the embodiments, it would be apparent to those skilled in the art that the embodiments are mere exemplifications, and various modifications may be made with respect to combination of each constituents, and such modifications are also within the scope of the present invention.

In the depicted embodiments, the reciprocally movable plunger 7 acts as the drive shaft. However, the rotation shaft may act as the drive shaft. That is, in an alternative structure, external force may be transmitted to the holding portion involving the fluid (air or lubrication oil) by the rotation shaft, and the fluid may be discharged outside of the holding portion.

In the depicted embodiment, the saber saw is exemplified as the powered tool. However, the present invention is also applicable to a motor-driven powered tool other than the saber saw such as a jig saw, a reciprocating saw, a hammer, and a hammer drill.

REFERENCE SIGNS LIST

1: saber saw, 2: housing, 3: motor, 4: control board, 5: control unit, 6: gear unit, 7: plunger, 8: blade mounting part, 9: dustproof mechanism part

The invention claimed is:

1. A powered tool comprising:
a housing;
a drive source rotatable in the housing;
a drive body supported in the housing so as to be reciprocated in a front-rear direction by a driving force of the drive source;
a gear housing accommodating at least a part of the drive body therein, the gear housing accommodating a lubricant therein;
a holding element attached to the gear housing, the holding element retaining at least a part of the lubricant;
a guide part having a hole penetrating the guide part in the front-rear direction, the guide part being configured to guide reciprocation of the drive body;
a sealing part in contact with an outer peripheral surface of the drive body; and
a holder supporting the guide part and the sealing part, the holder being configured to pivotally move integrally with both the guide part and the sealing part about an axis extending in a direction crossing the front-rear direction,
wherein, when the holder pivotally moves relative to the holding element, the holder contacts the holding element to cause the part of the lubricant to move to an outside of the holding element.

2. The powered tool according to claim 1, wherein, when the holder pivotally moves relative to the holding element, the holder presses the holding element to cause the holding element to discharge the part of the lubricant to the outside of the holding element.

3. The powered tool according to claim 2, wherein, when the holder pivotally moves relative to the holding element, the holder presses the holding element to compress and deform the holding element to cause the holding element to discharge the part of the lubricant to the outside of the holding element.

4. The powered tool according to claim 1,
wherein the holder has a space in which part of the lubricant is retained, the space being positioned rearward of the sealing part, and
wherein the holder is configured to supply the lubricant retained in the space to the outer peripheral surface of the drive body.

5. The powered tool according to claim 4, wherein the holding element has a curved surface facing the outer peripheral surface of the drive body and protruding toward the outer peripheral surface.

6. The powered tool according to claim 1,
wherein the sealing part comprises an O-ring and a felt,
wherein the guide part is positioned rearward of the felt,
wherein the holder has a space in which part of the lubricant is retained, the space being positioned rearward of the felt, and
wherein the holder is configured to supply the lubricant retained in the space to the outer peripheral surface of the drive body.

7. The powered tool according to claim 1, wherein the housing comprises an opening part through which a part of the drive body extends and an interior of the housing is communicated with an outside, the holding element being configured to discharge the lubricant toward the opening part by an external force of the holder.

8. The powered tool according to claim 1, wherein the holding element comprises a check valve portion configured to allow the lubricant to flow from an interior of the housing to an outside of the housing, but prevent the lubricant from flowing from the outside of the housing to the interior of the housing.

9. The powered tool according to claim 8, wherein:
the drive body is a drive shaft extending in a predetermined direction, and
the check valve portion comprises an extension portion extending toward an axis of the drive shaft and inclined with respect to a direction perpendicular to an axial direction of the drive body.

10. The powered tool according to claim 1, wherein the pivotally moving holder presses the holding element to reduce a volume of an internal space of the holding element to discharge the lubricant retained in the internal space to the outside of the holding element.

11. The powered tool according to claim 10, wherein:
the holding element is formed with a space retaining the part of the lubricant positioned apart from the drive body in a radial direction and a through-hole permitting the drive body to extend therethrough, and
the lubricant is discharged from the space to an outside of the housing through the through-hole.

12. The powered tool according to claim 11,
wherein the holding element is provided with a protrusion,
wherein the protrusion is configured to restrict the lubricant to flow into the space, and
wherein the protrusion is configured to permit the lubricant to flow into the space when the holding element is pressed by the pivotal movement of the holder.

13. The powered tool according to claim 1,
wherein a lubricant outside both the holder and the holding element is caused to flow into the holding element, and
wherein after the lubricant is caused to flow into and be retained in the holding element, the lubricant is supplied to the outer peripheral surface of the drive body.

14. A powered tool comprising:
a housing;
a drive source rotatable in the housing;
a drive body supported in the housing so as to be reciprocated by a driving force of the drive source;
a gear housing accommodating at least a part of the drive body therein;
a felt in contact with an outer peripheral surface of the drive body;
a guide part having a hole penetrating the guide part in a front-rear direction, the guide part being positioned rearward of the felt and configured to guide the reciprocating movement of the drive body; and
a holder supporting the guide part and the felt, the holder being configured to be pivotally movable integrally with both the guide part and the felt about an axis extending in a crossing direction crossing the front-rear direction;
wherein the holder is provided with a lubrication oil accommodating part that is configured to be a space retaining a lubricant supplied to the outer peripheral surface of the drive body, and
wherein the lubrication oil accommodating part is positioned rearward of the felt.

15. The powered tool according to claim 14, wherein at least a part of the lubrication oil accommodating part is closed to restrain the lubricant from leakage.

16. The powered tool according to claim 15, wherein a lubricant supplying passage is formed between the outer peripheral surface of the drive body and the lubrication oil accommodating part.

17. The powered tool according to claim 16, wherein:
the lubrication oil accommodating part is positioned at a position separated from the drive body in a radial direction of the drive body, and
the lubricant supplying passage is interposed between the lubrication oil accommodating part and the drive body in the radial direction.

18. The powered tool according to claim 17, wherein:
the drive body has one end portion provided with a mount to which an end bit can be detachably attached, and
the felt is positioned closer to the mount in a reciprocating direction of the drive body than the lubrication oil accommodating part is to the mount.

19. The powered tool according to claim 18,
wherein the holder is supported by the gear housing.

20. A powered tool comprising:
a housing;
a drive source rotatable in the housing;
a drive body supported in the housing so as to be reciprocated by a driving force of the drive source;
a gear housing accommodating at least a part of the drive body therein;
a sealing part in contact with an outer peripheral surface of the drive body, the sealing part including a felt;
a guide part configured to guide the reciprocating movement of the drive body, the guide part having a hole penetrating the guide part in a front-rear direction, the guide part being positioned rearward of the sealing part; and
a lubrication oil accommodating part having a space retaining a lubricant for supplying the lubricant to the outer peripheral surface of the drive body, the lubrication oil accommodating part being positioned rearward of the felt,
wherein reciprocating movement of the drive body moves at least part of the sealing part relative to the lubrication oil accommodating part in a direction of the reciprocating movement to cause the at least part of the sealing part to press and deform the lubricant oil accommodating part to discharge the lubricant from the space.

* * * * *